United States Patent
Kato

(10) Patent No.: US 11,899,096 B2
(45) Date of Patent: Feb. 13, 2024

(54) TRANSMISSION CONTROL DEVICE, VEHICLE SYSTEM, TRANSMISSION CONTROL METHOD, AND CONTROL PROGRAM PRODUCT

(71) Applicant: DENSO CORPORATION, Kariya (JP)

(72) Inventor: Kenji Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 326 days.

(21) Appl. No.: 17/316,462

(22) Filed: May 10, 2021

(65) Prior Publication Data
US 2021/0263141 A1    Aug. 26, 2021

Related U.S. Application Data

(63) Continuation of application No. PCT/JP2019/036534, filed on Sep. 18, 2019.

(30) Foreign Application Priority Data

Nov. 14, 2018   (JP) .................... 2018-214067

(51) Int. Cl.
*G01S 13/76* (2006.01)
*H01Q 1/32* (2006.01)
*B60R 25/24* (2013.01)

(52) U.S. Cl.
CPC ......... *G01S 13/762* (2013.01); *H01Q 1/3233* (2013.01); *B60R 25/24* (2013.01)

(58) Field of Classification Search
CPC ......... B60R 25/24; E05B 49/00; G01S 13/74; G01S 13/762; G01S 5/02
See application file for complete search history.

(56) References Cited

U.S. PATENT DOCUMENTS

| | | | |
|---|---|---|---|
| 2016/0205498 A1 | 7/2016 | Takigawa et al. | |
| 2019/0054897 A1* | 2/2019 | Naitou | B60R 25/31 |

FOREIGN PATENT DOCUMENTS

| | | |
|---|---|---|
| JP | 2013083081 A | 5/2013 |
| JP | 2015072162 A | 4/2015 |
| JP | 2018039378 A | 3/2018 |

OTHER PUBLICATIONS

U.S. Appl. No. 17/316,521, filed May 10, 2021, Kato.

* cited by examiner

*Primary Examiner* — Timothy A Brainard
(74) *Attorney, Agent, or Firm* — Harness, Dickey & Pierce, P.L.C.

(57) ABSTRACT

A transmission control device, which drives multiple antennas having different transmission ranges, includes: a genuine transmission control unit that transmits, from a genuine transmission antenna with use of a carrier wave, a genuine code for activating a portable device; and an inversion transmission control unit that transmits, from an inversion transmission antenna with use of a carrier wave, an inversion code including at least partial inverted genuine code concurrently with a transmission of the genuine code from the genuine transmission antenna. The inversion transmission antenna has a transmission range which does not overlap with a transmission range of the genuine transmission antenna.

13 Claims, 11 Drawing Sheets

US 11,899,096 B2

TRANSMISSION CONTROL DEVICE, VEHICLE SYSTEM, TRANSMISSION CONTROL METHOD, AND CONTROL PROGRAM PRODUCT

CROSS REFERENCE TO RELATED APPLICATIONS

The present application is a continuation application of International Patent Application No. PCT/JP2019/036534 filed on Sep. 18, 2019, which designated the U.S. and claims the benefit of priority from Japanese Patent Application No. 2018-214067, filed on Nov. 14, 2018. The entire disclosures of all of the above applications are incorporated herein by reference.

TECHNICAL FIELD

The present disclosure relates to a transmission control device, a vehicle system, a transmission control method, and a control program product each of which drives multiple antennas to identify two or more spatial regions using carrier waves transmitted from the antennas.

BACKGROUND

There has been known an authentication system that permits control of a vehicle in response to success of code verification between the vehicle and a portable device.

SUMMARY

The present disclosure provides a transmission control device which drives multiple antennas having different transmission ranges. The transmission control device includes: a genuine transmission control unit that transmits, from a genuine transmission antenna with use of a carrier wave, a genuine code for activating a portable device; and an inversion transmission control unit that transmits, from an inversion transmission antenna with use of a carrier wave, an inversion code including at least partial inverted genuine code concurrently with a transmission of the genuine code from the genuine transmission antenna. The inversion transmission antenna has a transmission range which does not overlap with a transmission range of the genuine transmission antenna.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
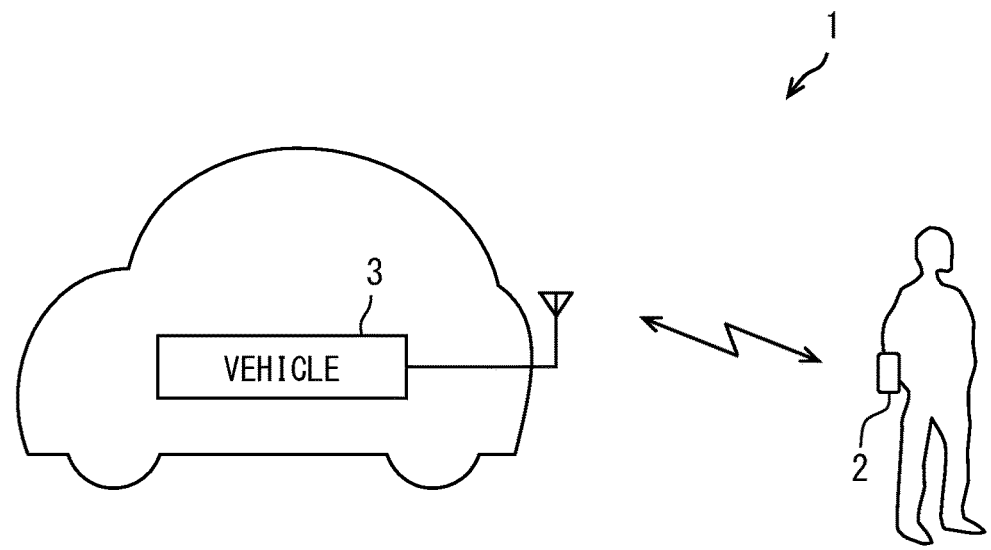
FIG. 1 is a diagram showing an example of a schematic configuration of a vehicle system.

Before describing embodiments of the present disclosure, a known authentication system will be described.

There has been known an authentication system that permits control of a vehicle in response to success of code verification which uses data transmitted and received via wireless communication between the vehicle and a portable device. In such an authentication system, a position of the portable device relative to the vehicle is detected by individually driving multiple antennas, which are arranged at respective positions of the vehicle and have different communication ranges with one another. Then, the authentication system performs a control according to the position of the portable device relative to the vehicle.

In the above-described technology, the position of the portable device may be erroneously detected due to crosstalk of the driven antenna. For example, when the antenna in a vehicle compartment is driven, an antenna drive current may also be superimposed on an antenna outside the vehicle compartment due to the crosstalk, and the data for code verification may be transmitted to an immediate vicinity of the antenna outside the vehicle compartment. In this case, although the portable device is positioned outside the vehicle compartment, code verification with the portable device may succeed when the antenna in the vehicle compartment is driven, and the position of the portable device may be erroneously detected as the inside of the vehicle compartment.

In a known technique that attempts to prevent erroneous detection of the position of the portable device due to crosstalk of a driven antenna, together with a call signal for calling the portable device, a first burst is transmitted from a first antenna and a second burst is transmitted from a second antenna following the first burst. The portable device detects received signal strengths of the first burst and the second burst, and the position of the portable device is determined based on one of the detected received signal strengths which is larger than a predetermined threshold value.

The above-described technique attempts to prevent erroneous detection of the position of the portable device caused by crosstalk of the driven antenna. However, this technique does not consider radiation noise generated by a transmission control device which is an electronic control device for controlling driving of the multiple antennas. Radiation noise generated by the transmission control device is limited to an immediate vicinity of the transmission control device. In a case where the portable device is located extremely close to the transmission control device, the radiation noise generated by the transmission control device for driving the antenna positioned outside the vehicle compartment is received by the portable device located inside the vehicle compartment. Thus, the portable device is erroneously determined to be positioned outside the vehicle compartment although the portable device is actually positioned inside the vehicle compartment. Further, when the antenna current is increased in order to enable position detection of the portable device at a relatively long distance from the vehicle, the radiation noise generated by the transmission control device also tends to increase, and above-described erroneous position detection of the portable device becomes more remarkable.

According to an aspect of the present disclosure, a transmission control device mounted on a vehicle and driving a plurality of antennas to detect a position of a portable device relative to the vehicle using a wireless communication between the portable device and the plurality of antennas is provided. The plurality of antennas are arranged at respective positions of the vehicle and have different transmission ranges from one another, and the portable device is carried by a user. The transmission control device includes: a genuine transmission control unit configured to control a genuine transmission antenna to transmit, with use of a carrier wave, a genuine code that activates the portable device, and the genuine transmission antenna being one of the plurality of antennas; and an inversion transmission control unit configured to control an inversion transmission antenna to transmit, with use of a carrier wave, an inversion code including at least partial inverted genuine code concurrently with a transmission of the genuine code from the genuine transmission antenna, and the inversion transmission antenna being one of the plurality of antennas and having a transmission range that does not overlap with a transmission range of the genuine transmission antenna.

According to an aspect of the present disclosure, transmission control method executed by a transmission control device is provided. The transmission control device is mounted on a vehicle and drives a plurality of antennas to detect a position of a portable device relative to the vehicle using a wireless communication between the portable device and the plurality of antennas. The plurality of antennas are arranged at respective positions of the vehicle and have different transmission ranges from one another, and the portable device is carried by a user. The transmission control method includes: transmitting, with use of a carrier wave from a genuine transmission antenna, a genuine code that activates the portable device, and the genuine transmission antenna being one of the plurality of antennas; and transmitting, with use of a carrier wave from an inversion transmission antenna, an inversion code including at least partial inverted genuine code concurrently with a transmission of the genuine code from the genuine transmission antenna, and the inversion transmission antenna being one of the plurality of antennas and having a transmission range that does not overlap with a transmission range of the genuine transmission antenna.

According to an aspect of the present disclosure, a control program product includes instructions for controlling a computer to be implemented as a transmission control device is provided. The transmission control device is mounted on a vehicle and drives a plurality of antennas to detect a position of the portable device relative to the vehicle using a wireless communication between the portable device and the plurality of antennas. The plurality of antennas are arranged at respective positions of the vehicle and have different transmission ranges from one another, and the portable device is carried by a user. The control program product further includes instructions that control the transmission control device to function as: a genuine transmission control unit configured to control a genuine transmission antenna to transmit, with use of a carrier wave, a genuine code that activates the portable device, and the genuine transmission antenna being one of the plurality of antennas; and an inversion transmission control unit configured to control an inversion transmission antenna to transmit, with use of a carrier wave, an inversion code including at least partial inverted genuine code concurrently with a transmission of the genuine code from the genuine transmission antenna, and the inversion transmission antenna being one of the plurality of antennas and having a transmission range that does not overlap with a transmission range of the genuine transmission antenna.

In the configuration of the present disclosure, the portable device receives the genuine code when the portable device is positioned within the transmission range of the genuine transmission antenna. The genuine code is a code for activating the portable device. When the portable device is positioned within the transmission range of the genuine transmission antenna, the portable device which receives the genuine code is activated and is controlled to transmit the information which enables a detection of the position of the portable device relative to the vehicle. Thus, the position of the portable device can be detected.

In the configuration of the present disclosure, the inversion code including at least partial inverted genuine code is transmitted from the inversion transmission antenna concurrently with a transmission of the genuine code from the genuine transmission antenna. In the transmission control device, the radiation noise (hereinafter referred to as genuine code radiation noise) is radiated when the genuine code is transmitted from the genuine transmission antenna. At the same time, the radiation noise (hereinafter referred to as inversion code radiation noise) is radiated when the inversion code is transmitted from the inversion transmission antenna. Thus, when the portable device receives the genuine code concurrently with the inversion code, a pattern of the genuine code is crushed by the inversion code. In a case where the portable device is positioned within a range where the genuine code radiation noise radiated from the transmission control device is received, the portable device receives the inversion code radiation noise at the same time. Thus, the genuine code radiation noise can be prevented from being received as the genuine code. The position of the portable device may be erroneously detected caused by the genuine code radiation noise radiated from the transmission control device that drives the genuine transmission antenna. With the configuration of the present disclosure, the erroneous detection of the position of the portable device can be prevented.

The inversion transmission antenna transmits the inversion code concurrently with the transmission of the genuine code from the genuine transmission antenna. The transmission range of the genuine transmission antenna does not overlap with the transmission range of the inversion transmission antenna. Thus, when the portable device is positioned within the transmission range of the genuine transmission antenna, the inversion code is not received by the portable device. Thus, the pattern of the genuine code transmitted toward the transmission range of the genuine transmission antenna is not crushed by the inversion code, and the portable device can successfully receive the genuine code. The position of the portable device relative to the vehicle is detected with use of a carrier wave transmitted from antennas mounted on the vehicle. With the configuration of the present disclosure, an erroneous detection of the position of the portable device caused by the radiation noise radiated from the transmission control device that drives the antennas can be prevented.

According to another aspect of the present disclosure, a transmission control device is provided. The transmission control device is mounted on a vehicle and drives a plurality of antennas to detect a position of a portable device relative to the vehicle using a wireless communication between the portable device and the plurality of antennas. The plurality of antennas are arranged at respective positions of the vehicle and have different transmission ranges from one another, and the portable device is carried by a user. The transmission control device includes: a first transmission control unit configured to control a first transmission antenna to transmit, with use of a carrier wave, a genuine code that activates the portable device and a first burst signal following the genuine code, and the genuine transmission antenna being one of the plurality of antennas; and a second transmission control unit configured to control a second transmission antenna to transmit, with use of a carrier wave, a second burst signal having a 180 degrees shifted phase from the first burst signal concurrently with a transmission of the first burst signal from the first antenna, and the second antenna being one of the plurality of antennas and having a transmission range that does not overlap with a transmission range of the first antenna.

According to another aspect of the present disclosure, a transmission control method executed by a transmission control device is provided. The transmission control device is mounted on a vehicle and drives a plurality of antennas to detect a position of a portable device relative to the vehicle using a wireless communication between the portable device and the plurality of antennas. The plurality of antennas are arranged at respective positions of the vehicle and have different transmission ranges from one another, and the portable device is carried by a user. The transmission control method includes: transmitting, with use of a carrier wave from a first transmission antenna, a genuine code that activates the portable device and a first burst signal following the genuine code, and the genuine transmission antenna being one of the plurality of antennas; and transmitting, with use of a carrier wave from a second transmission antenna, a second burst signal having a 180 degrees shifted phase from the first burst signal concurrently with a transmission of the first burst signal from the first antenna, and the second antenna being one of the plurality of antennas and having a transmission range that does not overlap with a transmission range of the first antenna.

According to another aspect of the present disclosure, a control program product for controlling a computer to be implemented as a transmission control device is provided. The transmission control device is mounted on a vehicle and drives a plurality of antennas to detect a position of the portable device relative to the vehicle using a wireless communication between the portable device and the plurality of antennas. The plurality of antennas are arranged at respective positions of the vehicle and have different transmission ranges from one another, and the portable device is carried by a user. The control program product further comprises instructions that control the transmission control device to function as: a first transmission control unit configured to control a first transmission antenna to transmit, with use of a carrier wave, a genuine code that activates the portable device and a first burst signal following the genuine code, and the genuine transmission antenna being one of the plurality of antennas; and a second transmission control unit configured to control a second transmission antenna to transmit, with use of a carrier wave, a second burst signal having a 180 degrees shifted phase from the first burst signal concurrently with a transmission of the first burst signal from the first antenna, and the second antenna being one of the plurality of antennas and having a transmission range that does not overlap with a transmission range of the first antenna.

In the configuration of the present disclosure, the first antenna transmits the first burst signal after transmission of the genuine code, and the second antenna transmits the second burst signal which has a 180 degrees shifted phase from the first burst signal concurrently with the transmission of the first burst signal from the first antenna. In the transmission control device, the radiation noise (hereinafter referred to as genuine code radiation noise) is radiated when the genuine code is transmitted from the genuine transmission antenna, and the radiation noise (hereinafter referred to as first bust radiation noise) is radiated when the first burst signal is transmitted from the genuine transmission antenna followed by the genuine code radiation noise. In the second antenna, radiation noise (hereinafter referred to as second burst radiation noise) is radiated when the second burst signal is transmitted, and the second burst radiation noise is radiated concurrently with the radiation of the first burst radiation noise. When the portable device receives the first burst signal and the second burst signal at the same time, since the second burst signal has the phase which is shifted from the phase of the first burst signal by 180 degrees, the first burst signal is canceled by the second burst signal. In a case where the portable device is positioned within a range where the genuine code radiation noise and the first burst radiation noise radiated from the transmission control device is received, the portable device receives the second burst radiation noise at the same time as the first burst radiation noise. Thus, although the genuine code radiation noise may be received as the genuine code, the first burst radiation noise can be prevented from being received as the first burst signal.

The transmission range of the first antenna does not overlap with the transmission range of the second antenna. Thus, in a case where the portable device is positioned with the transmission range of the first antenna, the first burst signal is not canceled by the second burst signal and the portable device can successfully receive the first burst signal following the genuine code. In a case where the portable device is positioned within a range where the genuine code radiation noise and the first burst radiation noise radiated from the transmission control device is received, the first burst radiation noise is canceled by the second burst radiation noise. Thus, the portable device fails to receive the first burst signal following the genuine code. With this configuration, the portable device transmits the information which enables the detection of the position of the portable device relative to the vehicle under a condition that the first burst signal is received after the reception of the genuine code. The position of the portable device may be erroneously detected caused by the genuine code radiation noise radiated from the transmission control device that drives the first antenna. With the configuration of the present disclosure, the erroneous detection of the position of the portable device can be prevented. The position of the portable device relative to the vehicle is detected with use of a carrier wave transmitted from antennas mounted on the vehicle. With the configuration of the present disclosure, an erroneous detection of the position of the portable device caused by the radiation noise radiated from the transmission control device that drives the antennas can be prevented.

According to another aspect of the present disclosure, a vehicle system is provided. The vehicle system includes: a portable device carried by a user; and a transmission control device mounted on a vehicle and driving a plurality of antennas to detect a position of the portable device relative to the vehicle using a wireless communication between the portable device and the plurality of antennas, the plurality of antennas being arranged at respective positions of the vehicle and having different transmission ranges from one another. The transmission control device includes: a first transmission control unit configured to control a first transmission antenna to transmit, with use of a carrier wave, a genuine code that activates the portable device and a first burst signal following the genuine code, the genuine transmission antenna being one of the plurality of antennas; and a second transmission control unit configured to control a second transmission antenna to transmit, with use of a carrier wave, a second burst signal having a 180 degrees shifted phase from the first burst signal concurrently with a transmission of the first burst signal from the first antenna, and the second antenna being one of the plurality of antennas and having a transmission range that does not overlap with a transmission range of the first antenna. The portable device includes a transmission unit. The transmission unit is configured to transmit information which enables a detection of the position of the portable device relative to the vehicle in response to a reception of the first burst signal followed by the genuine code. The transmission unit is configured to not transmit the information which enables the detection of the position of the portable device relative to the vehicle when the first burst signal is not received after a reception of the genuine code.

In the configuration of the present disclosure, the first antenna transmits the first burst signal after transmission of the genuine code, and the second antenna transmits the second burst signal which has a 180 degrees shifted phase from the first burst signal concurrently with the transmission of the first burst signal from the first antenna. In the transmission control device, the radiation noise (hereinafter referred to as genuine code radiation noise) is radiated when the genuine code is transmitted from the genuine transmission antenna, and the radiation noise (hereinafter referred to as first bust radiation noise) is radiated when the first burst signal is transmitted from the genuine transmission antenna followed by the genuine code radiation noise. In the second antenna, radiation noise (hereinafter referred to as second burst radiation noise) is radiated when the second burst signal is transmitted, and the second burst radiation noise is radiated concurrently with the radiation of the first burst radiation noise. When the portable device receives the first burst signal and the second burst signal at the same time, since the second burst signal has the phase which is shifted from the phase of the first burst signal by 180 degrees, the first burst signal is canceled by the second burst signal. In a case where the portable device is positioned within a range where the genuine code radiation noise and the first burst radiation noise radiated from the transmission control device is received, the portable device receives the second burst radiation noise at the same time as the first burst radiation noise. Thus, although the genuine code radiation noise may be received as the genuine code, the first burst radiation noise can be prevented from being received as the first burst signal.

The transmission range of the first antenna does not overlap with the transmission range of the second antenna. Thus, in a case where the portable device is positioned with the transmission range of the first antenna, the first burst signal is not canceled by the second burst signal and the portable device can successfully receive the first burst signal following the genuine code. In a case where the portable device is positioned within a range where the genuine code radiation noise and the first burst radiation noise radiated from the transmission control device is received, the first burst radiation noise is canceled by the second burst radiation noise. Thus, the portable device fails to receive the first burst signal following the genuine code. The portable device transmits the information which enables the detection of the position of the portable device relative to the vehicle in response to the reception of the first burst signal following the genuine code. The portable device does not transmit the information which enables the detection of the position of the portable device relative to the vehicle when the first burst signal is not received after reception of the genuine code. The position of the portable device may be erroneously detected caused by the genuine code radiation noise radiated from the transmission control device that drives the first antenna. With the configuration of the present disclosure, the erroneous detection of the position of the portable device can be prevented. The position of the portable device relative to the vehicle is detected with use of a carrier wave transmitted from antennas mounted on the vehicle. With the configuration of the present disclosure, an erroneous detection of the position of the portable device caused by the radiation noise radiated from the transmission control device that drives the antennas can be prevented.

The following will describe embodiments of the present disclosure with reference to the accompanying drawings. For convenience of description, the same reference symbols are assigned to portions having the same functions as those illustrated in the drawings used in the description of embodiments, and a description of the same portion may be omitted. The description of other embodiments may be referred to with respect to these portions given the same reference symbols.

First Embodiment (Schematic Configuration of Vehicle System 1)

The following will describe a first embodiment of the present disclosure with reference to the accompanying drawings. A vehicle system 1 shown in FIG. 1 includes a portable device 2 carried by a user and a vehicle unit 3 equipped to a vehicle.

The vehicle system 1 has well-known smart function. The smart function is known as an authentication function which authenticates a portable device 2 by performing a verification between the portable device 2 and the vehicle unit 3 via wireless communication, and enables control of the vehicle as an authenticated target in response to the authentication being succeeded. Examples of vehicle control enabled by the authentication may include locking or unlocking of doors, start of a vehicle driving source, activation of convenient functions such as turning on a welcome light. The convenience function may refer to a function that improves the convenience and satisfaction of a user who uses the vehicle. For example, the convenient functions may include turning on position lamps as the welcome light and automatic air conditioning operation.

(Schematic Configuration of Portable Device 2)

Figure 2:
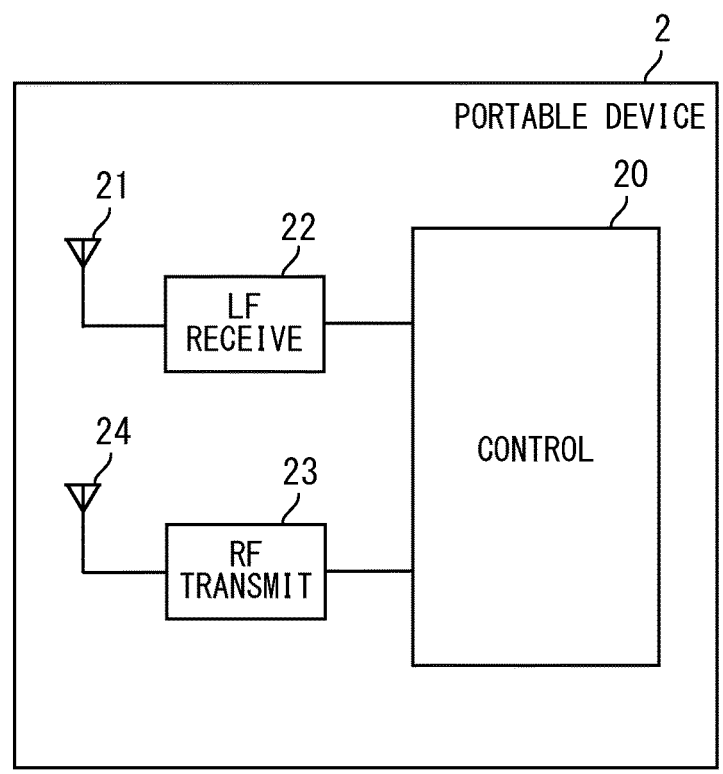
FIG. 2 is a diagram showing an example of a schematic configuration of a portable device.

The following will describe a configuration of the portable device 2 with reference to FIG. 2. As shown in FIG. 2, the portable device 2 includes a control device 20, a LF reception antenna 21, a LF reception unit 22, a RF transmission unit 23, and a RF transmission antenna 24. The portable device 2 has an electronic key function. The portable device 2 may be provided by a key fob, a multifunctional mobile phone having the electronic key function, or the like.

The LF reception antenna 21 receives a request signal transmitted from the vehicle unit 3 via radio waves (also known as carrier waves) having LF (Low Frequency) band. The LF band is defined as a low frequency band of, for example, from 30 kHz to 300 kHz. The request signal may be a signal including a Wakeup ID which is a code for switching the portable device 2 from a sleep state to a wakeup state. The Wakeup ID may also be referred to as a code for activating the portable device 2. This Wakeup ID corresponds to a genuine code. The request signal may be a signal including a random number code. The signal including the random number code may be used in an encrypted communication that requests a transmission of the code for verification. Both of the signal including Wakeup ID and the signal including the random number code may be individually used as the request signal. Alternatively, a signal including both of the Wakeup ID and the random number code may be used as the request signal.

The LF reception unit 22 generates a reception signal by electrically processing the signal received by the LF reception antenna 21, and outputs the generated reception signal to the control device 20. The LF reception unit 22, which may be provided by an IC or the like, determines a validity of the Wakeup ID in a case where the request signal includes the Wakeup ID. As an example, the LF reception unit compares a pattern of a genuine code registered in advance in a non-volatile memory of the LF reception unit 22 with the received Wakeup ID, and determines whether the received Wakeup ID is a genuine code. In response to determining that the WAKE code is a genuine signal pattern, the control device 20 switches from the sleep state to the wakeup state. In the sleep state, a power consumption is significantly reduced compared with the wakeup state. In response to the LF reception unit 22 determining that the WAKE code does not match the genuine signal pattern and the WAKE code is different from the regular signal pattern, the control device 20 does not switch from the sleep state to the wakeup state.

The RF transmission unit 23 generates a response signal in response to the LF signal received by the LF reception antenna 21 by electrically processing an original signal output from the control device 20. The RF transmission unit 23 transmits the generated response signal via the RF transmission antenna 24. The RF transmission antenna 24 transmits the response signal using radio waves having RF band. For example, the RF band may be defined as a frequency band of 300 Hz to 3 THz. In the present embodiment, the following description is made under a condition that the response signal is transmitted by the radio waves of the UHF (Ultra High Frequency) band within the RF band. For example, the UHF band may be defined as a frequency band of 300 MHz to 3 GHz.

The control device 20 may be provided by an IC, a microcomputer, or the like. In response to receiving the reception signal of the request signal from the LF reception unit 22, the control device 20 generates the original signal of the response signal in response to the request signal, and outputs the original signal to the RF transmission unit 23. In a case where the request signal includes the random number code, the random number code is encrypted by a private key and an encryption algorithm under a public key cryptography method. In this way, the control device 20 generates an encrypted code. Then, the control device 20 includes the encrypted code in the original signal of the response signal, and outputs the original signal of the response signal to the RF transmission unit 23. In this way, the response signal including the encrypted code is transmitted from the portable device 2. In a case where the request signal does not include the random number code, the control device 20 may output the original signal of the response signal, which indicates that the Wakeup ID has been received, to the RF transmission unit 23. In this case, the original signal of the response signal does not include the encrypted code.

(Schematic Configuration of Vehicle Unit 3)

Figure 3:
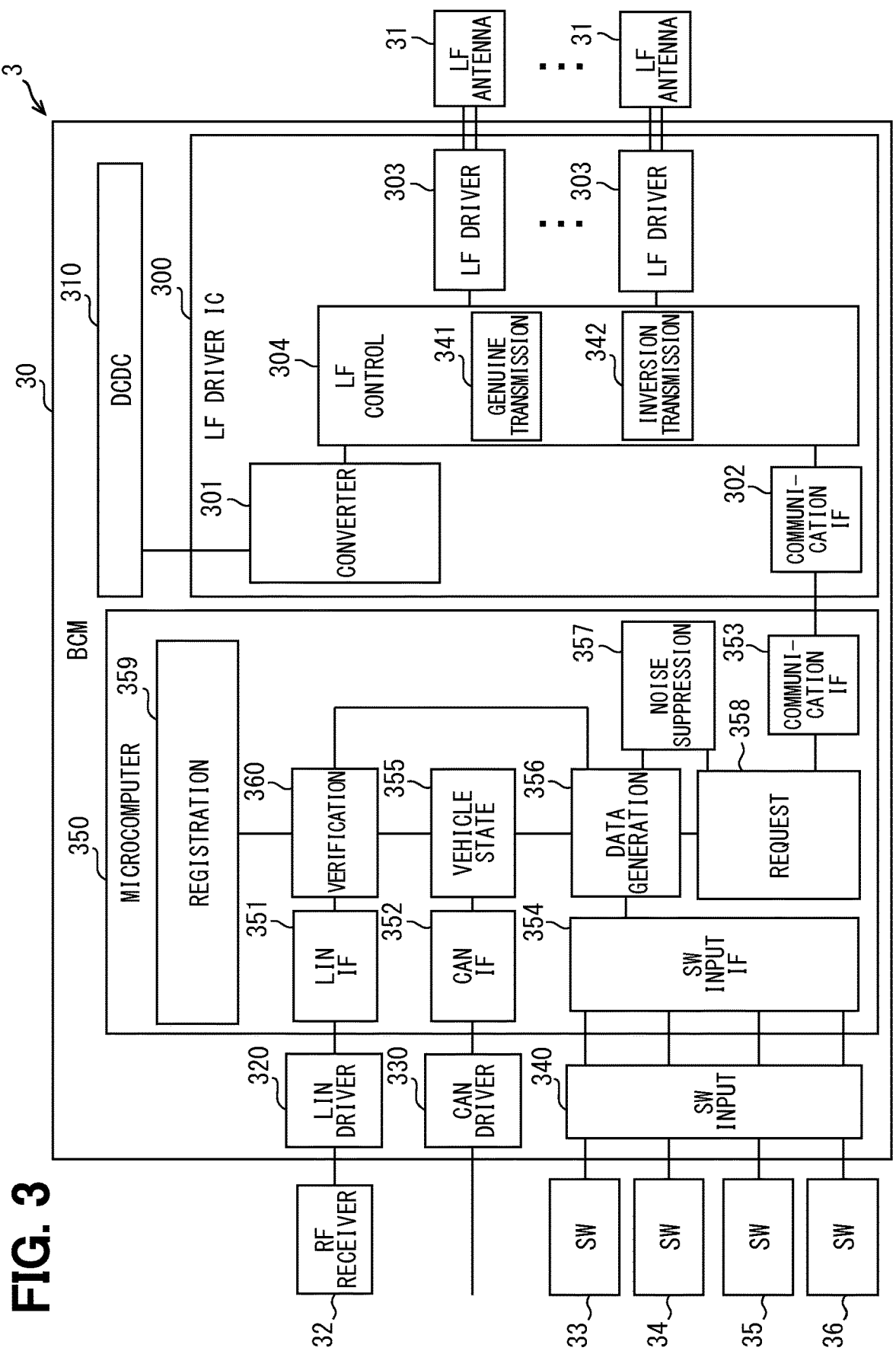
FIG. 3 is a diagram showing an example of a schematic configuration of a vehicle unit and a BCM.

The following will describe an example of a schematic configuration of the vehicle unit 3 with reference to FIG. 2. As shown in FIG. 3, the vehicle unit 3 includes a body control Module (BCM) 30, an LF antenna 31, an RF receiver 32, a D seat door handle switch (hereinafter referred to as SW) 33, a P seat door handle SW 34, a rear bumper SW 35, and a push SW 36.

The LF antenna 31 is a transmission antenna that transmits a signal using radio waves of LF band. The vehicle may be equipped with multiple LF antennas 31. For example, the LF antenna 31 may include outside antennas disposed outside the vehicle compartment and inside antennas disposed inside the vehicle compartment. For example, the outside antennas may include a D seat antenna 31D disposed in the vicinity of a driver's seat (referred to as D seat) door, a P seat antenna 31P disposed in the vicinity of a passenger seat (referred to as P seat) door, and a rear bumper antenna 31R disposed in the vicinity of a rear bumper. For example, the inside antennas may include an instrument panel antenna 311 disposed in the vicinity of an instrument panel, a center console antenna 31C disposed in the vicinity of a center console, and a trunk antenna 31T disposed in a trunk room. Hereinafter, in a case where it is not necessary to distinguish above-described antennas, these antennas are collectively referred to as LF antenna(s) 31.

In a case where the vehicle body is made of metal, the radio waves having LF band are blocked by the vehicle body. Thus, a transmission range of the radio wave having LF band transmitted from the outside antenna among the LF antennas 31 is difficult to reach inside of the vehicle compartment. The transmission range of the LF band radio wave transmitted from the inside antenna among the LF antennas 31 is difficult to reach outside of the vehicle compartment. The following will describe an example of transmission ranges of the D seat antenna 31D, the P seat antenna 31P, the rear bumper antenna 31R, the instrument panel antenna 311, the center console antenna 31C, and the trunk antenna 31T with reference to FIG. 4. In this example, the driver's seat is disposed on a right side of the vehicle. When the driver's seat is disposed on a left side of the vehicle, correspondingly, the D seat antenna 31D is arranged on the left side of the vehicle, the P seat antenna 31P is arranged on the right side of the vehicle, and the description regarding left and right should be understood in reversed way.

Figure 4:
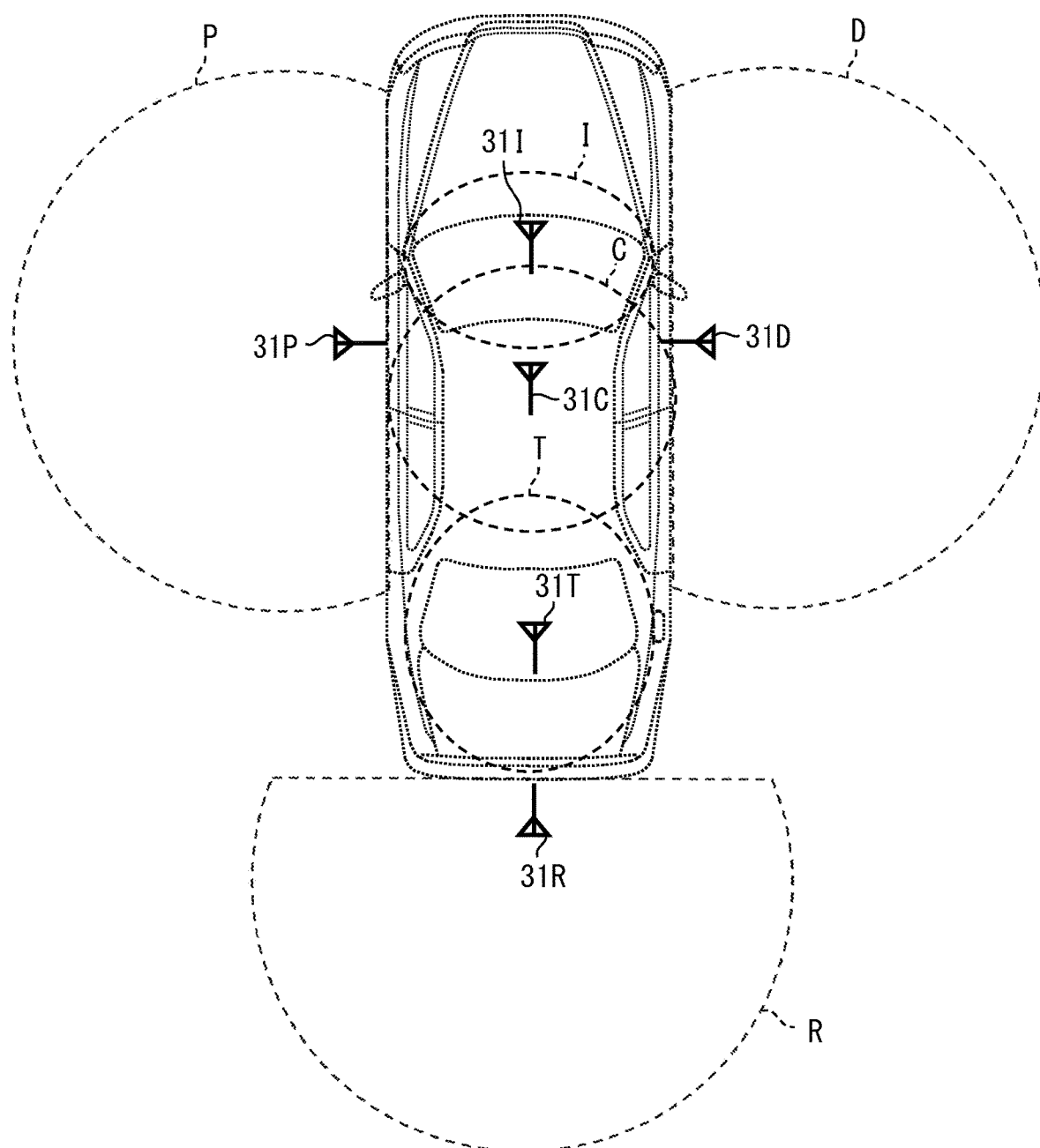
FIG. 4 is a diagram showing an example of transmission ranges of multiple LF antennas.

As shown in FIG. 4, the transmission range D of the D seat antenna 31D extends toward the right side of the driver's seat door in an area outside of the vehicle compartment. The transmission range P of the P seat antenna 31P extends toward the left side of the driver's seat door in the area outside of the vehicle compartment. The transmission range R of the rear bumper antenna 31R extends toward a rear side of the rear bumper in the area outside of the vehicle compartment. The transmission ranges D, P, and R are set so that they do not overlap with one another. As an example, by adjusting the transmission output powers of the LF antennas 31, the transmission ranges D, P, and R are set so as not to overlap with one another.

As shown in FIG. 4, the transmission range I of the instrument panel antenna 311 extends toward a front side of the vehicle compartment in the vehicle compartment. The transmission range C of the center console antenna 31C covers a center of the vehicle compartment in the vehicle compartment. The transmission range I of the trunk antenna 31T extends toward a rear side of the vehicle compartment in the vehicle compartment. The transmission range I and the transmission range C overlap with one another, and the transmission range C and the transmission range T overlap with one another. The transmission ranges I, C, and T of the inside antennas are set so as not to overlap with the transmission ranges D, P, and R of the outside antennas. As an example, the positions of the LF antennas 31 may be arranged inside and outside of the vehicle compartment so that the transmission ranges of the inside antennas do not overlap with the transmission ranges of the outside antennas. Alternatively, the transmission output powers of the LF antennas 31 may be adjusted so that the transmission ranges of the inside antennas do not overlap with the transmission ranges of the outside antennas.

The RF receiver 32 receives the response signal transmitted from the portable device 2 via the radio waves of RF band. The D seat door handle SW 33 is disposed on an outer door handle of the driver's seat of the vehicle. The P seat door handle SW 34 is disposed on an outer door handle of the passenger seat of the vehicle. The rear bumper SW 35 is disposed on the rear bumper of the vehicle. The push SW 36 is disposed in a front area of the driver's seat, and receives a start operation of driving source of the vehicle. The D seat door handle SW 33, the P seat door handle SW 34, the rear bumper SW 35, and the push SW 36 correspond to switches operated by a user when using the vehicle.

The BCM 30 includes a processor, an IC, a memory, an I/O, and a bus connecting these devices, and executes a control program stored in the memory to perform various processes, such as a process of vehicle related authentication and a process related to transmission control of signal from the LF antenna 31 (hereinafter referred to as a transmission control related processes). Execution of the control program by the processor corresponds to execution of a method corresponding to the control program. The memory is a non-transitory tangible storage medium, and non-temporally stores computer readable programs and data. The non-transitory tangible storage medium may be provided by a semiconductor memory or a magnetic disk.

(Schematic Configuration of BCM 30)

The following will describe an example of a schematic configuration of the BCM 30 with reference to FIG. 3. As shown in FIG. 3, the BCM 30 includes an LF driver IC 300, a DCDC circuit 310, a LIN driver 320, a CAN (registered trademark) driver 330, a SW input circuit 340, and a microcomputer 350.

The BCM 30 is connected to a CAN bus, which is a transmission path for performing communication using CAN as a communication protocol. The BCM 30 is also connected to a LIN bus, which is a transmission path for performing communication using LIN as a communication protocol. The BCM 30 exchanges information with another electronic control device, such as a power unit ECU that controls the driving source of the vehicle using the CAN bus as the transmission path. The BCM 30 exchanges information with an actuator, such as a door lock motor, a vehicle light, the RF receiver 32, or the like using the LIN bus as the transmission path.

The DCDC circuit 310 inputs a DC voltage to the LF driver IC 300. The LIN driver 320 outputs information to the LIN bus or acquires, from the LIN bus, the information output to the LIN bus. The LIN driver 320 acquires, from the RF receiver 32, a code of the response signal acquired by the RF receiver 32. The LIN driver 320 outputs the acquired information to the microcomputer 350. The LIN driver 320 outputs, to the door lock motor, a drive signal output from the microcomputer 350 for controlling locking and unlocking of the vehicle door.

The CAN driver 330 outputs information to the CAN bus or acquires, from the CAN bus, information output to the CAN bus. The CAN driver 330 outputs, to the power unit ECU, a start permission signal output from the microcomputer 350. The CAN driver 330 acquires a sensing result indicating a vehicle state such as a vehicle speed output from another ECU, and outputs the sensing result to the microcomputer 350.

The SW input circuit 340 receives the signals transmitted from the D seat door handle SW 33, the P seat door handle SW 34, the rear bumper SW 35, and the push SW 36, and outputs the received signals to the microcomputer 350. It is assumed that the SW input circuit 340 also inputs a signal such as a door courtesy switch for detecting an opening or closing of the door.

As shown in FIG. 3, the microcomputer 350 includes a LIN interface (hereinafter referred to as IF) 351, a CAN IF 352, a microcomputer communication IF 353, a SW input IF 354, a vehicle state determination unit 355, a communication data generation unit 356, a noise suppression control unit 357, a request unit 358, a registration unit 359, and a verification unit 360 as functional blocks.

The LIN IF 351 performs a communication between the LIN driver 320 and the microcomputer 350. The CAN IF 352 performs a communication between the CAN driver 330 and the microcomputer 350. The microcomputer communication IF 353 performs a serial communication between the microcomputer 350 and the LF driver IC 300. The SW input IF 354 performs a communication between the SW input circuit 340 and the microcomputer 350.

The vehicle state determination unit 355 determines the state of the vehicle based on the sensing result related to the vehicle state acquired from the CAN driver 330 via the CAN IF 352. For example, the vehicle state determination unit 355 determines whether the vehicle is in a parked state based on a vehicle speed detected by a vehicle speed sensor, a shift position detected by a shift position sensor, a signal from a parking brake switch, or the like.

The communication data generation unit 356 generates data of the signal to be transmitted from the LF antenna 31 according to the signal acquired via the SW input circuit 340, the vehicle state determined by the vehicle state determination unit 355, and the lock/unlock state of the vehicle door. For example, in a case (hereinafter referred to as a welcome scene) where the vehicle state determination unit 355 determines that (i) the vehicle is in parked state, (ii) the vehicle door is locked after the vehicle door is opened and closed, and (iii) a signal indicating an operation of an outside switch of the vehicle compartment (hereinafter referred to as outside SW), such as the D seat door handle SW 33, the P seat door handle SW 34, the rear bumper SW 35, or the push SW 36 is not inputted, the communication data generation unit 356 generates the request signal data which includes the Wakeup ID but not include the random number code.

In a case (hereinafter referred to as an unlocking scene) where the vehicle state determination unit 355 determines that (i) the vehicle is in the parked state, (ii) the vehicle door is in locked state, and (iii) the signal indicating an operation of one of the outside SWs is inputted, the communication data generation unit 356 generates the request signal data to include both of the Wakeup ID and the random number code. In a case (hereinafter referred to as a locking scene) where the vehicle state determination unit 355 determines that (i) the vehicle is in the parked state, (ii) the vehicle door is locked after the vehicle door is opened and closed, and (iii) the signal indicating an operation of one of the outside SWs is inputted, the communication data generation unit 356 generates the request signal data to include both of the Wakeup ID and the random number code. In a case (hereinafter referred to as a departure scene) where the vehicle state determination unit 355 determines that (i) the vehicle is in the parked state and (ii) a signal indicating an operation of push SW 36 is inputted, the communication data generation unit 356 generates the request signal data to include both of the Wakeup ID and the random number code.

The noise suppression control unit 357 controls the communication data generation unit 356 to generate the request signal data so that at least partial code of Wakeup ID included in the request signal data is inverted. For example, when the communication data generation unit 356 generates the request signal in the welcome scene, the communication data generation unit 356 may generate inverted code data obtained by inverting at least partial code of the Wakeup ID. When the communication data generation unit 356 generates the request signal in the locking scene, the unlocking scene, or the departure scene, the communication data generation unit 356 may generate the inverted code data obtained by inverting entire code of the Wakeup ID.

The Wakeup ID is a binary code represented by "1" and "0", and the inverted code is a code in which the values of "1" and "0" are inverted relative to the code of Wakeup ID. For example, when the Wakeup ID is "11010011 . . . ", the inverted code is "00101100 . . . ".

Figure 5:
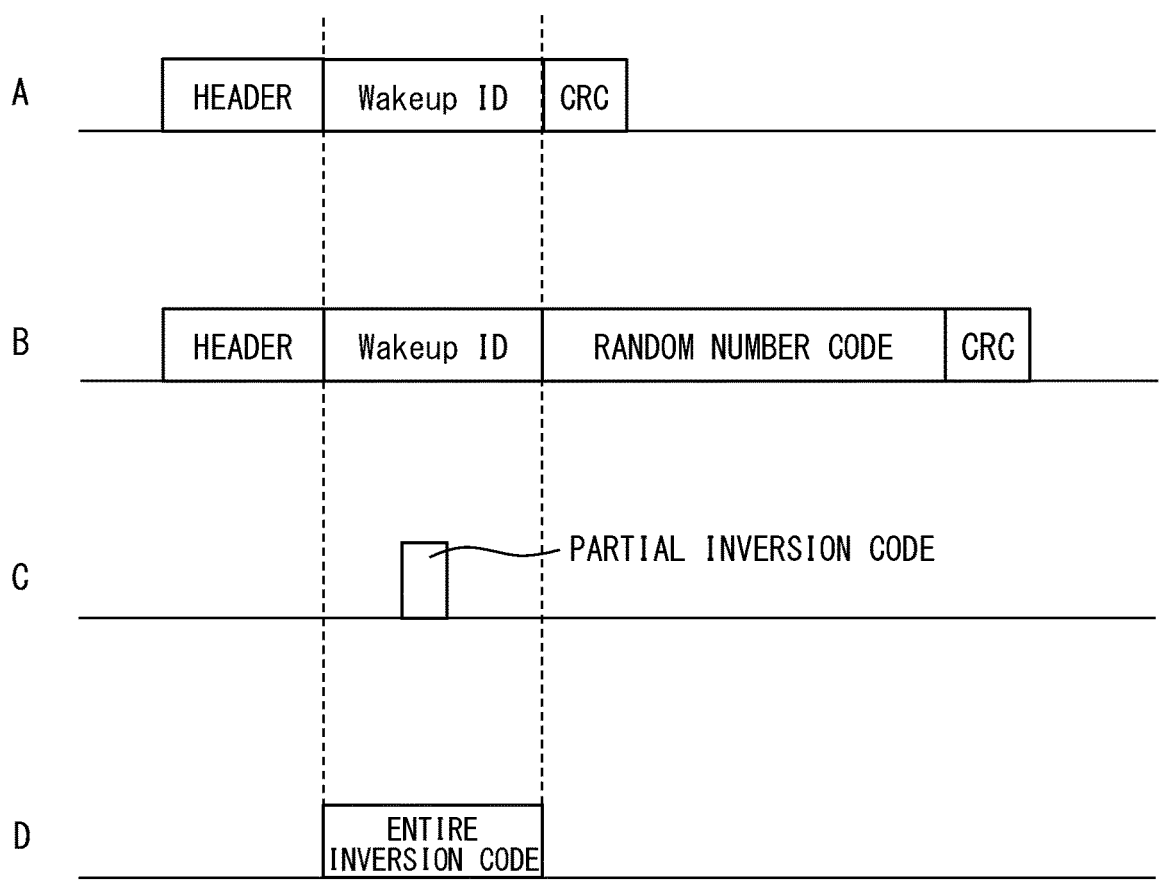
FIG. 5 is a diagram schematically showing an example of data structures of request signal data including Wakeup ID and inverted code data.

The following will describe an example of data structures of request signal data including Wakeup ID and inverted code data of the request signal data with reference to FIG. 5. FIG. 5 shows an example of the request signal data A generated by the communication data generation unit 356 in the welcome scene. FIG. 5 shows an example of the request signal data B generated by the communication data generation unit 356 in the locking scene, unlocking scene, and departure scene. FIG. 5 shows an example of inverted code data C in which partial code of Wakeup ID is inverted. FIG. 5 shows an example of inverted code data D in which entire code of Wakeup ID is inverted.

As shown in signal A of FIG. 5, the request signal data generated by the communication data generation unit 356 in the welcome scene includes a header and a CRC (Cyclic Redundancy Code) in addition to the Wakeup ID. For example, the Wakeup ID may be a 16-bit binary code. The request signal data generated by the communication data generation unit 356 in the locking scene, the unlocking scene, and the departure scene includes a header, a random number code, and a CRC in addition to the Wakeup ID. As shown in signal C and signal D of FIG. 5, the inverted code data may include partial or entire inverted Wakeup ID without including the header, the random number code, the CRC. In order to simplify the software for generating signal data by the communication data generation unit 356, the header, the CRC, or the like may also be added to the inverted code.

As shown in signal C of FIG. 5, in the data of the inverted code (hereinafter referred to as partial inversion code) in which partial code of Wakeup ID is inverted, a length of the data is equal to a length of the partial Wakeup ID. As an example, in a case where the Wakeup ID is 16 bits, the partial inversion code may be 4 bits. The partial inversion code may be generated by inverting any part of Wakeup ID. As shown in signal D of FIG. 5, in the data of the inverted code (hereinafter referred to as entire inversion code) in which entire code of Wakeup ID is inverted, a length of the data is equal to a length of the Wakeup ID. As an example, in a case where the Wakeup ID is 16 bits, the entire inversion code is 16 bits.

The request unit 358 requests the LF driver IC 300 to transmit the request signal via the microcomputer communication IF 353. The request unit 358 requests the LF driver IC 300 to transmit the signal of the inverted code via the microcomputer communication IF 353 according to the instruction from the noise suppression control unit 357.

As an example, in the welcome scene, the request unit 358 requests a periodic and repeated transmission of the request signal, which is generated by the communication data generation unit 356 to include the Wakeup ID but not include the random number code. In this case, for example, the transmission of request signal may be performed in a predetermined order, such as the D seat antenna 31D, the P seat antenna 31P, and the rear bumper antenna 31R in described order. It is possible to suppress the dark current since the random number code is not included in the request signal which is transmitted periodically. The noise suppression control unit 357 controls the request unit 358 to request transmission of partial inversion code from another LF antenna 31 concurrently with the transmission request of the request signal. Another LF antenna is different from the LF antenna 31 that transmits the request signal, and has a transmission range that does not overlap with a transmission range of the LF antenna 31 that transmits the request signal. In this case, the LF antenna 31 that transmits the request signal corresponds to a genuine transmission antenna, and the LF antenna 31 that transmits the partial inversion code corresponds to an inversion transmission antenna.

For example, the LF antenna 31 whose transmission range does not overlap with the D seat antenna 31D may be the P seat antenna 31P, the rear bumper antenna 31R, and the trunk antenna 31T. The LF antenna 31 whose transmission range does not overlap with the P seat antenna 31P may be the D seat antenna 31D, the rear bumper antenna 31R, and the trunk antenna 31T. The LF antenna 31 whose transmission range does not overlap with the rear bumper antenna 31R may be the D seat antenna 31D, the P seat antenna 31P, and the instrument panel antenna 311.

In the unlocking scene, the request unit 358 requests transmission of the request signal, which includes the Wakeup ID and the random number code and is generated by the communication data generation unit 356, for example, in a single shot. In this case, the request unit 358 may request the transmission of the request signal from one of the outside antennas corresponding to the outside SW that is operated. As an example, the D seat door handle SW 33 may correspond to the D seat antenna 31D, the P seat door handle SW 34 may correspond to the P seat antenna 31P, and the rear bumper SW 35 may correspond to the rear bumper antenna 31R. The noise suppression control unit 357 controls the request unit 358 to request transmission of entire inversion code from another LF antenna 31 concurrently with the transmission request of the request signal. Another LF antenna is different from the LF antenna 31 that transmits the request signal, and has a transmission range that does not overlap with a transmission range of the LF antenna 31 that transmits the request signal.

In the locking scene, the request unit 358 requests a transmission of the request signal, which is generated by the communication data generation unit 356 to include the Wakeup ID and the random number code. In this case, the request unit 358 may request the transmission of the request signal from one of the outside antennas corresponding to the outside SW that is operated. The noise suppression control unit 357 controls the request unit 358 to request transmission of entire inversion code from another LF antenna 31 concurrently with the transmission request of the request signal. Another LF antenna is different from the LF antenna 31 that transmits the request signal, and has a transmission range that does not overlap with a transmission range of the LF antenna 31 that transmits the request signal.

In the departure scene, the request unit 358 requests transmission of the request signal, which includes the Wakeup ID and the random number code and is generated by the communication data generation unit 356, for example, in a single shot. In this case, the request unit 358 may request the transmission of the request signal from the instrument panel antenna 311 that corresponds to the push SW 36. The noise suppression control unit 357 controls the request unit 358 to request transmission of entire inversion code from the outside antenna 31 concurrently with the transmission request of the request signal from the instrument panel antenna 311. The outside antenna 31 has a transmission range that does not overlap with the transmission range of the instrument panel antenna 311.

The registration unit 359 may be provided by an electrically rewritable non-volatile memory, and stores information related to the authentication. The information related to authentication may include a private key used in the public key cryptography method.

The verification unit 360 performs a process according to the response signal acquired from the RF receiver 32 via the LIN IF 351. For example, in the welcome scene, the verification unit 360 activates convenient functions, such as turning on of the welcome light in response to the RF receiver 32 receiving the response signal that does not include the encrypted code. The RF receiver 32 receives the response signal in response to the request signal transmitted from the outside antenna. As an example, a drive signal for turning on the welcome light is output to each light, such as the position lamp, vehicle compartment inside lamp via the LIN IF 351 and the LIN driver 320 for automatically turning on these lamps.

In the locking and unlocking scenes, the verification unit 360 compares the encrypted code included in the response signal acquired from the RF receiver 32 via the LIN IF 351 with information related to authentication stored in the registration unit 359 in order to authenticate the response signal. Specifically, the verification unit 360 compares the encrypted code included in the response signal, which is acquired by the RF receiver 32 in response to the request signal transmitted from the outside antenna, with an encrypted code obtained by encrypting the random code of the challenge signal transmitted from the LF antenna 31 using the private key stored in the registration unit 359. In response to a success of the code verification, the verification unit 360 outputs a drive signal for controlling the locking/unlocking of the door of the vehicle to the door lock motor via the LIN IF 351 and the LIN driver 320, and the vehicle locks or unlocks the door according to the drive signal.

In the departure scene, the verification unit 360 compares the encrypted code included in the response signal acquired from the RF receiver 32 via the LIN IF 351 with information related to authentication stored in the registration unit 359 in order to verify the response signal. Specifically, the verification unit 360 compares the encrypted code included in the response signal, which is acquired by the RF receiver 32 in response to the request signal transmitted from the inside antenna such as instrument panel antenna 311, with an encrypted code obtained by encrypting the random code of the challenge signal transmitted from the LF antenna 31 using the private key stored in the registration unit 359. In response to a success of the code verification, the verification unit 360 outputs a start permission signal to the power unit ECU via the CAN IF 352 and the CAN driver 330 to start the driving source of the vehicle.

The LF driver IC 300 controls the LF antenna 31 to transmit a signal. The LF driver IC 300 and the BCM 30 including the LF driver IC 300 correspond to a transmission control device. The LF driver IC 300 transmits the request signal from the LF antenna 31 according to a transmission request from the microcomputer 350. As shown in FIG. 3, the LF driver IC 300 includes, as functional blocks, a DCDC converter 301, an IC communication IF 302, LF drivers 303, and an LF control unit 304.

The DCDC converter 301 converts a DC voltage input from the DCDC circuit 310 into a power supply voltage required for the operation of the LF driver IC 300. The IC communication IF 302 performs a serial communication between the LF driver IC 300 and the microcomputer 350. The LF driver 303 outputs, to the LF antenna 31, a drive current for transmitting a signal according to a control of the LF control unit 304.

The LF control unit 304 controls the LF driver 303 to output, to the LF antenna 31, the drive current for transmitting a signal. The LF antenna 31 transmits a signal according to the drive current. The LF control unit 304 controls multiple LF drivers 303 independently from one another. When the LF control unit 304 receives the signal transmission request from the microcomputer 350 via the IC communication IF 302, the LF control unit 304 outputs, to the LF antenna 31, the drive current so that LF antenna 31 transmits the signal. The LF control unit 304 includes a genuine transmission control unit 341 and an inversion transmission control unit 342 as functional blocks. The genuine transmission control unit 341 and the inversion transmission control unit 342 may be provided by separate control circuits, or may be provided by a single control circuit.

The genuine transmission control unit 341 controls the LF antenna 31 to transmit the request signal in accordance with the request transmitted from the microcomputer 350. The inversion transmission control unit 342 controls, according to the request transmitted from the microcomputer 350, another LF antenna 31 to transmit the signal of the inversion code concurrently with the transmission of the request signal. A transmission range of another LF antenna 31 that transmits the signal of inversion code does not overlap with a transmission range of the LF antenna 31 that transmits the request signal.

For example, in the welcome scene, the genuine transmission control unit 341 performs a polling of the D seat antenna 31D, the P seat antenna 31P, and the rear bumper antenna 31R in order to periodically and repeatedly transmit the request signal including the Wakeup ID but not the random number code. The inversion transmission control unit 342 controls another LF antenna 31 to transmit the signal of the partial inversion code concurrently with the transmission of the request signal. A transmission range of another LF antenna 31 that transmits the signal of partial inversion code does not overlap with a transmission range of the LF antenna 31 that transmits the request signal.

In the locking and unlocking scenes, the genuine transmission control unit 341 controls the LF antenna 31, which corresponds to the outside switch that is operated, to transmit the request signal including the Wakeup ID and the random number code. The inversion transmission control unit 342 controls another LF antenna 31 to transmit the signal of the entire inversion code concurrently with the transmission of the request signal. A transmission range of another LF antenna 31 does not overlap with the transmission range of the LF antenna 31 that transmits the request signal.

In the departure scene, the genuine transmission control unit 341 controls the instrument panel antenna 311 corresponding to the operated push SW 36 to transmit the request signal including the Wakeup ID and the random number code. The inversion transmission control unit 342 controls the outside antenna to transmit the signal of the entire inversion code concurrently with the transmission of the request signal. A transmission range of the outside antenna does not overlap with the transmission range of the instrument panel antenna 31 that transmits the request signal.

When the BCM 30 drives the LF antenna 31 to transmit the request signal and the signal of inversion code, the signals are transmitted from the LF antenna 31. At the same time, radiation noise of the signals are also transmitted from the wiring and wire harness of the printed circuit of BCM 30 and extends toward the immediate vicinity of the BCM 30.

The transmission range of the LF antenna 31 that transmits the request signal does not overlap with the LF antenna 31 that transmits the signal of the inversion code. Thus, the portable device 2 existing within the transmission range of the LF antenna 31 that transmits the request signal receives the request signal, but does not receive the signal of inversion code. In a case where the portable device 2 exists in the immediate vicinity of the BCM 30, the radiation noise of the request signal and the radiation noise of the inverted code signal are substantially concurrently received by the portable device. When the portable device 2 receives radiation noises of the request signal and the inversion code signal at substantially the same timing, the Wakeup ID pattern included in the request signal may be crushed by the inversion code pattern. Therefore, the Wakeup ID cannot be correctly read by the portable device 2, and the Wakeup ID included in the radiation noise cannot be received as the Wakeup ID.

When transmitting the signal of the inversion code, the inversion transmission control unit 342 may control transmission of the signal of the inversion code using radio wave having a transmission output power equal to or larger than that of the radio wave by which the request signal including the Wakeup ID is transmitted. In this configuration, the radiation noise of the inversion code signal generated in the immediate vicinity of the BCM 30 becomes greater than the radiation noise of the request signal generated in the immediate vicinity of the BCM 30. Thus, the Wakeup ID pattern included in the radiation noise can be crushed by the inversion code pattern included in the radiation noise more reliably.

In the above description, the inversion code signal is transmitted from one LF antenna 31. However, the transmission of inversion code signal is not limited to one LF antenna. For example, the inversion code signal may be transmitted from multiple LF antennas 31 whose transmission ranges do not overlap with the LF antenna 31 that transmits the request signal at the same time with the transmission of inversion code signal. When the inversion transmission control unit 342 controls multiple LF antennas 31 to transmit the inversion code signal, a total transmission output power of the radio waves of the multiple antennas by which the inversion code signal is carried is set to be equal to or greater than the transmission output power of the radio wave by which the request signal including the Wakeup ID is carried.

(Transmission Control Related Process in BCM 30)

Figure 6:
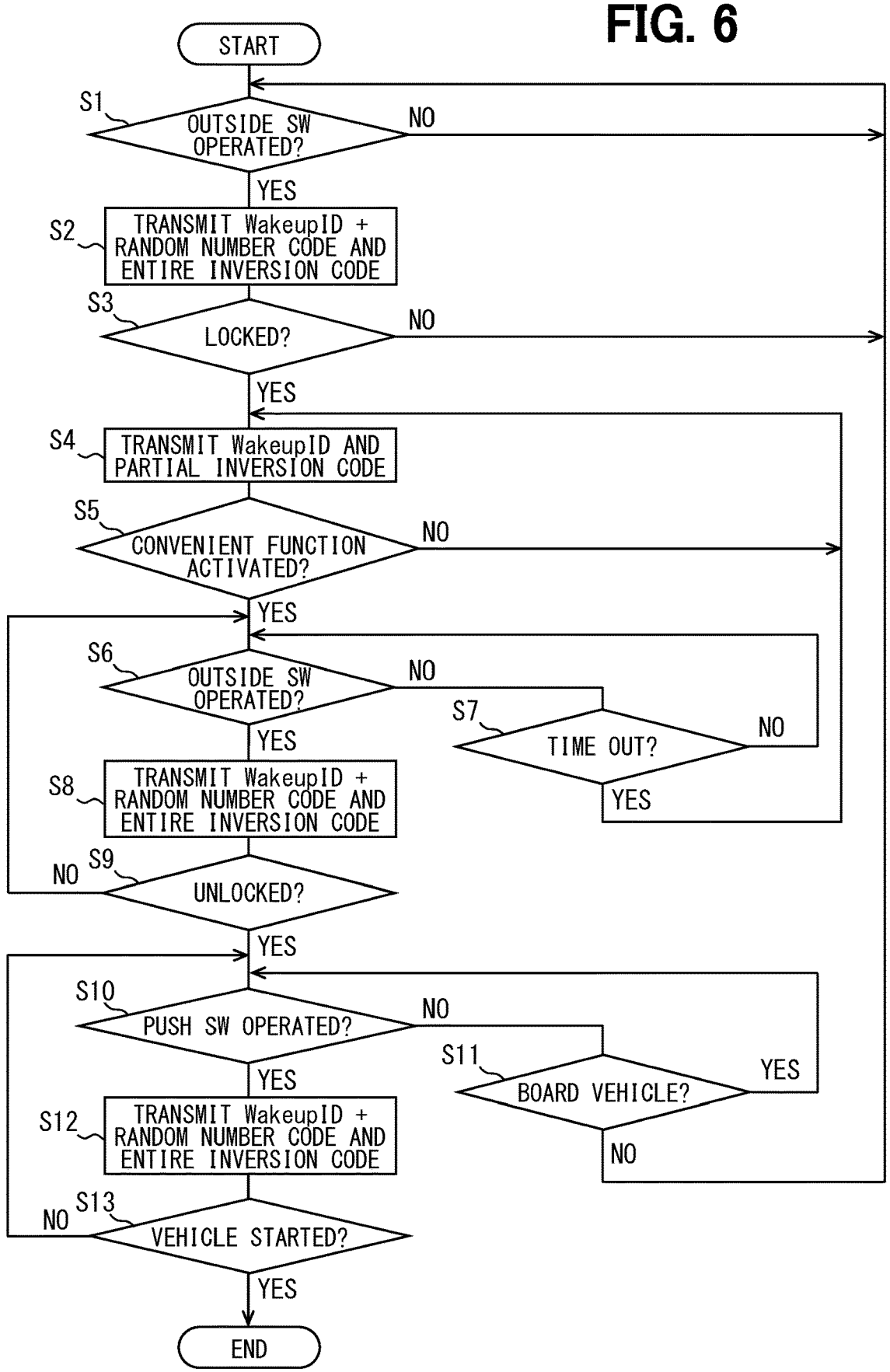
FIG. 6 is a flowchart showing an example of a transmission control process executed by a BCM.

The following will describe an example of the transmission control related process executed by the BCM 30 with reference to FIG. 6. The flowchart of FIG. 6 may be configured to start when the vehicle is parked and then the vehicle door is opened and closed. The parked state of the vehicle may be determined by the vehicle state determination unit 355, and opening and closing of the vehicle door may be determined based on the signal from the door courtesy switch.

In S1, when the outside SW of the vehicle is operated (S1: YES), the process proceeds to S2. Whether the outside SW is operated or not may be determined based on the signal acquired by the communication data generation unit 356 via the SW input circuit 340. When the outside SW is not operated (S1: NO), the process repeats S1.

In S2, the communication data generation unit 356 generates the data of the request signal including the Wakeup ID and the random number code, and also generates the data of the entire inversion code in which entire code of the Wakeup ID is inverted. The request unit 358 requests transmission of the request signal including the Wakeup ID and the random number code from the outside antenna corresponding to the outside switch that is determined to be operated in S1. The request unit 358 also periodically requests transmission of the entire inversion code from another LF antenna 31 concurrently with the transmission request of the request signal. Another LF antenna 31 is different from the LF antenna 31 that transmits the request signal, and has a transmission range that does not overlap with a transmission range of the LF antenna 31 that transmits the request signal. As a result, the request signal including the Wakeup ID and the random number code is transmitted from the outside antenna corresponding to the outside switch that is determined to be operated in S1. At the same time, the entire inversion code is transmitted from another LF antenna 31 whose transmission range does not overlap with the transmission range of the outside antenna that transmits the request signal.

When the portable device 2 exists in the immediate vicinity of the BCM 30 and the radiation noise from the BCM 30 is received by the portable device 2, the Wakeup ID included in the radiation noise cannot be properly received as the Wakeup ID as described above. Therefore, the response signal is not transmitted from the portable device 2. When the portable device 2 exists within the transmission range of the outside antenna corresponding to the outside switch determined to be operated in S1, the Wakeup ID included in the request signal can be properly received as the Wakeup ID and the portable device 2 transmits the response signal in response to the request signal. The verification unit 360 authenticates the encrypted code included in the response signal transmitted from the portable device 2, and locks the vehicle door in response to the success of the authentication.

In S3, when the verification unit 360 determines that the authentication is succeeded, the vehicle door is locked (S3:

YES), and the process proceeds to S4. When the verification unit 360 determines the authentication is failed, the vehicle door is not locked (S3: NO), and the process returns to S1 and the process is repeated.

In S4, the communication data generation unit 356 generates the data of the request signal including the Wakeup ID but not including the random number code, and generates the data of the partial inversion code in which partial code of the Wakeup ID is inverted. The request unit 358 periodically requests the transmission of request signal, which includes the Wakeup ID, in a predetermined order, such as the D seat antenna 31D, the P seat antenna 31P, and the rear bumper antenna 31R in described order. The request unit 358 also requests transmission of the partial inversion code from another LF antenna 31 concurrently with the transmission request of the request signal. Another LF antenna 31 is different from the LF antenna 31 that transmits the request signal, and has a transmission range that does not overlap with the transmission range of the LF antenna 31 that transmits the request signal. With this configuration, polling is performed so that the request signals including the Wakeup ID but not including the random number code is periodically and sequentially transmitted from the D seat antenna 31D, the P seat antenna 31P, and the rear bumper antenna 31R. Concurrently with the transmission of the request signal, the signal of the partial inversion code is periodically transmitted from the LF antenna 31 whose transmission range does not overlap with the transmission range of the outside antenna that transmits the request signal.

When parking the vehicle, it is considered that there is a demand to suppress the dark current. In the above configuration, the partial inversion code having a smaller number of bits than the entire inversion code is adopted as the inversion code to be transmitted periodically. Thus, it is possible to further suppress the increase of dark current.

When the portable device 2 exists within the transmission range of the outside antenna, the Wakeup ID included in the request signal can be properly received as the Wakeup ID and the portable device 2 transmits the response signal in response to the request signal. When the request signal does not include the random number code, the response signal in response to the request signal does not include the encrypted code. In response to the RF receiver 32 receiving the response signal that does not include the encrypted code, the verification unit 360 activates the convenient function such as turning on the welcome light or the like.

In S5, when the RF receiver 32 receives the response signal that does not include the encrypted code and the verification unit 360 activates the convenient function (S5: YES), the process proceeds to S6. When the RF receiver 32 does not receive the response signal that does not include the encrypted code and the verification unit 360 does not activate the convenient function (S5: NO), the process returns to S4. The periodic transmission of the request signal is repeated.

In S6, when the outside SW of the vehicle is operated (S6: YES), the process proceeds to S8. When the outside SW is not operated (S6: NO), the process proceeds to S7. In S7, when the elapsed time from the activation of the convenient function in S5 exceeds a predetermined duration, that is, time outs (S7: YES), the process returns to S4 and the periodic transmission of the request signal is repeated. When the elapsed time from the activation of the convenience function in S5 does not exceed the predetermined duration, that is, time does not out (S7: NO), the process returns to S6 and repeats S6 and S7. The predetermined duration for determining timeout may be properly set as necessary.

In S8, the communication data generation unit 356 generates the data of the request signal including the Wakeup ID and the random number code, and also generates the data of the entire inversion code in which entire code of the Wakeup ID are inverted. The request unit 358 requests transmission of the request signal including the Wakeup ID and the random number code from the outside antenna corresponding to the outside switch that is determined to be operated in S6. The request unit 358 also periodically requests transmission of the entire inversion code from another LF antenna 31 concurrently with the transmission request of the request signal. Another LF antenna 31 is different from the LF antenna 31 that transmits the request signal, and has a transmission range that does not overlap with a transmission range of the LF antenna 31 that transmits the request signal. As a result, the request signal including the Wakeup ID and the random number code is transmitted from the outside antenna corresponding to the outside switch that is determined to be operated in S6. At the same time, the entire inversion code is transmitted from another LF antenna 31 whose transmission range does not overlap with the transmission range of the outside antenna that transmits the request signal.

When the portable device 2 exists within the transmission range of the outside antenna, the Wakeup ID included in the request signal can be properly received as the Wakeup ID and the portable device 2 transmits the response signal in response to the request signal. The verification unit 360 authenticates the encrypted code included in the response signal transmitted from the portable device 2, and unlocks the vehicle door in response to the success of the authentication.

In S9, when the verification unit 360 determines that the authentication is succeeded, the vehicle door is unlocked (S9: YES), and the process proceeds to S10. When the verification unit 360 determines the authentication is failed, the vehicle door is not unlocked (S9: NO), and the process returns to S6 and the process is repeated.

In S10, when the push SW 36 is operated (S10: YES), the process proceeds to S12. When the push SW 36 is not operated (S10: NO), the process proceeds to S11. In S11, when the user boards the vehicle (S11: YES), the process returns to S10 and repeats S10 and S11. When the user does not board the vehicle (S11: NO), the process returns to S1 and the process is repeated. Whether the user is in the vehicle compartment may be determined by determining whether the vehicle door is opened or closed based on the signal of the door courtesy switch acquired by the communication data generation unit 356 via the SW input circuit 340. In addition, the determination may also be made based on a signal of a seat sensor of the vehicle or the like.

In S12, the communication data generation unit 356 generates the data of the request signal including the Wakeup ID and the random number code, and also generates the data of the entire inversion code in which entire code of the Wakeup ID are inverted. The request unit 358 requests transmission of the request signal including the Wakeup ID and the random number code from the instrument panel antenna 311. The request unit 358 also requests transmission of the entire inversion code from outside antenna, which has a transmission range that does not overlap with the transmission range of the instrument panel antenna 311, concurrently with the transmission request of the request signal from the instrument panel antenna 311. As a result, the request signal including the Wakeup ID and the random number code is transmitted from the instrument panel antenna 311. At the same time, the entire inversion code is transmitted from the outside antenna whose transmission range does not overlap with the transmission range of the instrument panel antenna 311.

When the portable device 2 exists within the transmission range of the instrument panel antenna 311, the Wakeup ID included in the request signal can be properly received as the Wakeup ID and the portable device 2 transmits the response signal in response to the request signal. The verification unit 360 authenticates the encrypted code included in the response signal transmitted from the portable device 2, and permits a start of driving source of the vehicle door in response to the success of the authentication.

In S13, when the verification unit 360 succeeds in the authentication and the driving source of the vehicle is started (S13: YES), the transmission control related process is ended. When the verification unit 360 fails in the authentication and the driving source of the vehicle is not started (S13: NO), the process returns to S10 and the process is repeated.

According to the configuration of the first embodiment, the transmission of the partial inversion code in which at least partial Wakeup ID is inverted is executed concurrently with the transmission of the request signal which includes the Wakeup ID, and the LF antenna 31 that transmits the partial inversion code has the transmission range which does not overlap with the transmission range of the LF antenna 31 that transmits the request signal. With this configuration, when the radiation noise of the request signal and the inversion code signal is radiated in the very vicinity of the BCM 30, the Wakeup ID pattern in the radiation noise of request signal is crushed by the inversion code pattern in the radiation noise of inversion code signal, and the reception of the Wakeup ID included in the radiation noise of the request signal by the portable device 2 can be avoided.

The transmission range of the LF antenna 31 that transmits the request signal is set to not overlap with the transmission range of the LF antenna 31 that transmits the inversion code. Thus, within the transmission range of the LF antenna 31 that transmits the request signal, the Wakeup ID pattern included in the request signal is not crushed by the inversion code pattern. Therefore, within the transmission range of the LF antenna 31 that transmits the request signal, the portable device 2 can properly receive the Wakeup ID and can transmit the response signal in response to the request signal. Thus, it is possible to prevent the portable device 2 from erroneously transmitting the response signal in response to the radiation noise radiated from the BCM 30.

For example, suppose that outside antenna transmits the request signal and the portable device 2 does not exist in the transmission range of the outside antenna but exists in the vehicle compartment. In this case, the erroneous transmission of the response signal from the portable device 2 in response to the radiation noise output from the BCM 30 can be reliably prevented. Therefore, even though the portable device 2 exists in the vehicle compartment, the erroneous determination by the BCM 30 that the portable device 2 exists outside the vehicle compartment can be avoided.

Second Embodiment

In the first embodiment, the entire inversion code and the partial inversion code are used individually as the inversion code. However, the present disclosure is not necessarily limited to the configuration of the first embodiment. For example, only the entire inversion code may be used as the inversion code, or only the partial inversion code may be used as the inversion code.

Third Embodiment

Figure 7:
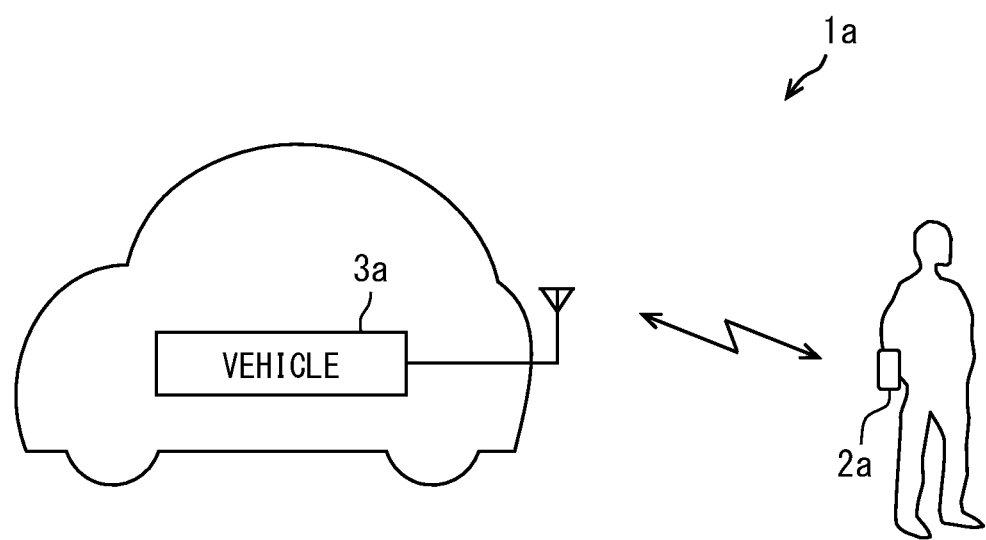
FIG. 7 is a diagram showing an example of a schematic configuration of a vehicle system.

The following will describe a third embodiment of the present disclosure with reference to the accompanying drawings. A vehicle system 1a shown in FIG. 7 includes a portable device 2a carried by a user and a vehicle unit 3a equipped to a vehicle. The vehicle system 1a has well-known smart function similar to the vehicle system 1.

The vehicle unit 3a is the same as the vehicle unit 3 of the first embodiment except that a burst signal is transmitted instead of transmission of the inversion code from the LF antenna 31. The portable device 2a is the same as the portable device 2 of the first embodiment except that process is performed according to the burst signal transmitted from the vehicle unit 3a.

(Schematic Configurations of Vehicle Unit 3a and BCM 30a)

Figure 8:
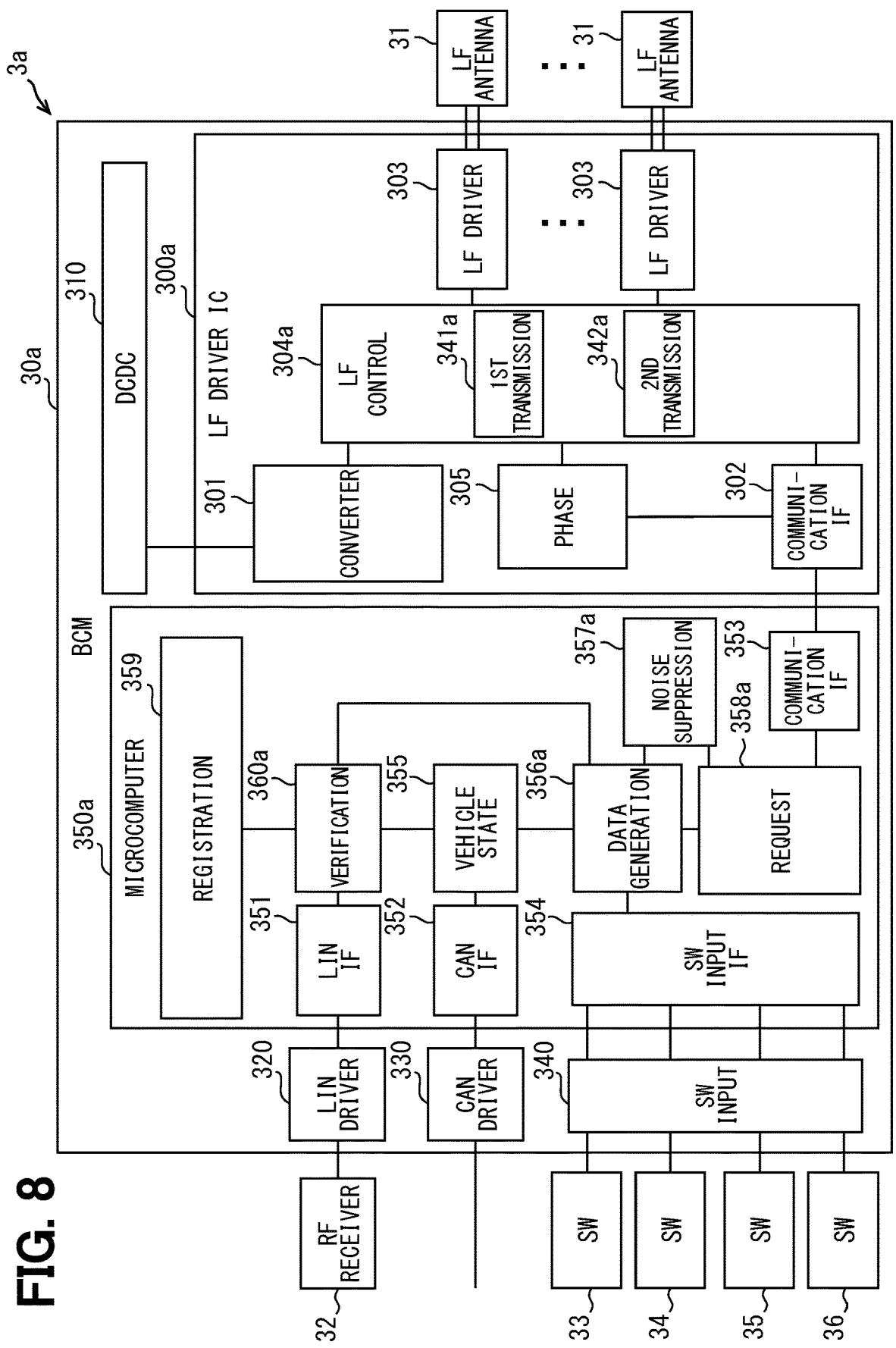
FIG. 8 is a diagram showing an example of a schematic configuration of a vehicle unit and a BCM.

The following will describe an example of a schematic configuration of the vehicle unit 3a with reference to FIG. 8. As shown in FIG. 8, the vehicle unit 3a includes a BCM 30a, an LF antenna 31, an RF receiver 32, a D seat door handle SW 33, a P seat door handle SW 34, a rear bumper SW 35, and a push SW 36. The vehicle unit 3a is similar to the vehicle unit 3 of the first embodiment except that the vehicle unit 3a includes the BCM 30a instead of the BCM 30.

The following will describe an example of a schematic configuration of the BCM 30a with reference to FIG. 8. As shown in FIG. 8, the BCM 30a includes an LF driver IC 300a, a DCDC circuit 310, a LIN driver 320, a CAN driver 330, a SW input circuit 340, and a microcomputer 350a. The BCM 30a is similar to the BCM 30 of the first embodiment except that the BCM 30a includes the LF driver IC 300a and the microcomputer 350a instead of the LF driver IC 300 and the microcomputer 350.

As shown in FIG. 3, the microcomputer 350a includes a LIN IF 351, a CAN IF 352, a microcomputer communication IF 353, a SW input IF 354, a vehicle state determination unit 355, a communication data generation unit 356a, a noise suppression control unit 357a, a request unit 358a, a registration unit 359, and a verification unit 360a as functional blocks. The microcomputer 350a is similar to the microcomputer 350 of the first embodiment except that the microcomputer 350a includes the communication data generation unit 356a, the noise suppression control unit 357a, the request unit 358a, and the verification unit 360a instead of the communication data generation unit 356, the noise suppression control unit 357, the request unit 358, and the verification unit 360.

The communication data generation unit 356a is similar to the communication data generation unit 356 of the first embodiment except that the communication data generation unit 356 does not generate the inversion code data. The request unit 358a is similar to the request unit 358 of the first embodiment except that the request unit 358a requests the transmission of burst signal to the LF driver IC 300 instead of the transmission of the inversion code signal to the LF driver IC 300.

The request unit 358a requests the transmission of the request signal, and subsequently requests the transmission of the burst signal. In the present embodiment, the request unit 358a requests transmission of a burst signal of which received signal strength indicator (hereinafter referred to as RSSI) is required to be measured for avoiding a relay attack.

Hereinafter, the burst signal whose received signal strength indicator is measured for avoiding the relay attack is also referred to as measurement purpose burst signal. Further, in response to the instruction from the noise suppression control unit 357a, the request unit 358a requests transmission of another burst signal for suppressing radiation noise from the BCM 30. Hereinafter, the burst signal used for suppressing radiation noise from the BCM 30 is referred to as noise suppression purpose burst signal. The relay attack is a method of code verification by indirectly establishing a communication between the portable device 2a and the BCM 30a using one or more relay devices. Further, the measurement purpose burst signal whose received signal strength is measured has different usage purpose from the noise suppression purpose burst signal, and the signal names are designated for description convenience.

As an example, in the welcome scene, the request unit 358a requests a periodic and repeated transmission of the request signal, the measurement purpose burst signal and the noise suppression purpose burst signal following the request signal. The request signal is generated by the communication data generation unit 356a to include the Wakeup ID but not include the random number code. In this case, for example, the transmission of request signal, measurement purpose burst signal, and the noise suppression purpose burst signal may be performed in a predetermined order, such as the D seat antenna 31D, the P seat antenna 31P, and the rear bumper antenna 31R in described order. The noise suppression control unit 357a controls the request unit 358a to request transmission of a burst signal which has 180 degrees shifted phase (hereinafter referred to as inverted phase burst signal) from the noise suppression purpose burst signal from another LF antenna 31 concurrently with the transmission of the noise suppression purpose burst signal. Herein, another LF antenna 31 is selected so that a transmission range of another LF antenna 31 that transmits the inverted phase burst signal does not overlap with a transmission range of the LF antenna 31 that transmits the request signal. The noise suppression purpose burst signal corresponds to a first burst signal, and the inverted phase burst signal corresponds to a second burst signal. In this case, the LF antenna 31 that transmits the noise suppression purpose burst signal corresponds to a first antenna, and the LF antenna 31 that transmits the inverted phase burst signal corresponds to a second antenna.

In the unlocking scene, the request unit 358a requests transmission of the request signal, which includes the Wakeup ID and the random number code and is generated by the communication data generation unit 356a, the measurement purpose burst signal and the noise suppression purpose burst signal following the request signal, for example, in a single shot. In this case, the request unit 358a may request the transmission of the request signal, the measurement purpose burst signal, and the noise suppression purpose burst signal from one of the outside antennas corresponding to the outside SW that is operated. The noise suppression control unit 357a controls the request unit 358a to request transmission of inverted phase burst signal from another LF antenna 31 concurrently with the transmission request of the noise suppression purpose burst signal. Another LF antenna 31 is different from the LF antenna 31 that transmits the request signal, and has a transmission range that does not overlap with a transmission range of the LF antenna 31 that transmits the request signal.

In the locking scene, the request unit 358a requests transmission of the request signal, which includes the Wakeup ID and the random number code and is generated by the communication data generation unit 356a, the measurement purpose burst signal and the noise suppression purpose burst signal following the request signal. In this case, the request unit 358a may request the transmission of the request signal, the measurement purpose burst signal, and the noise suppression purpose burst signal from one of the outside antennas corresponding to the outside SW that is operated. After transmitting the request signal, the measurement purpose burst signal may be transmitted from the inside antennas in a predetermined order at a different transmission time from one another. The noise suppression control unit 357a controls the request unit 358a to request transmission of inverted phase burst signal from another LF antenna 31 concurrently with the transmission request of the noise suppression purpose burst signal. Another LF antenna 31 is different from the LF antenna 31 that transmits the request signal, and has a transmission range that does not overlap with a transmission range of the LF antenna 31 that transmits the request signal.

In the departure scene, the request unit 358a requests transmission of the request signal, which includes the Wakeup ID and the random number code and is generated by the communication data generation unit 356a, the measurement purpose burst signal and the noise suppression purpose burst signal following the request signal, for example, in a single shot. In this case, the request unit 358a may request the transmission of the request signal, the measurement purpose burst signal, and the noise suppression purpose burst signal from the instrument panel antenna 31I that corresponds to the push SW 36. The noise suppression control unit 357a controls the request unit 358a to request transmission of inverted phase burst signal from outside antenna concurrently with the transmission request of the noise suppression purpose burst signal. The outside antenna has a transmission range that does not overlap with a transmission range of the instrument panel antenna 31I.

The verification unit 360a is similar to the verification unit 360 of the first embodiment except that the authentication of the response signal is carried out using threshold value determination information included in the response signal. Herein, the response signal is acquired by the RF receiver 32. The portable device 2 measures the RSSI of the measurement purpose burst signal transmitted from the LF antenna 31, and determines whether the measured RSSI of the measurement purpose burst signal is within a threshold range. The threshold value determination information is information about the determination result of the portable device 2. The threshold value is a value for distinguishing the RSSI of the signal in a case of relay attack from the RSSI of a genuine signal, and is set to be a value so that the RSSI of signal in a case of relay attack is out of the threshold range. The verification unit 360a succeeds in the authentication when the code verification is succeeded and the threshold value determination information is within a proper range. The verification unit 360a fails in the authentication when the code verification is succeeded but the threshold value determination information is out of the proper range.

As shown in FIG. 8, the LF driver IC 300a includes, as functional blocks, a DCDC converter 301, an IC communication IF 302, an LF drivers 303, an LF control unit 304a, and a phase control unit 305. The LF driver IC 300a is similar to the LF driver IC 300 of the first embodiment except that the LF driver IC 300a further includes the phase control unit 305, and includes the LF control unit 304a instead of the LF control unit 304. The LF driver IC 300a and the BCM 30a including the LF driver IC 300a correspond to a transmission control device.

The LF control unit 304a controls the LF driver 303 to output, to the LF antenna 31, the drive current for transmitting a signal. The LF antenna 31 transmits a signal according to the drive current. The LF control unit 304a controls multiple LF drivers 303 independently from one another. When the LF control unit 304a receives the signal transmission request from the microcomputer 350a via the IC communication IF 302, the LF control unit 304a outputs, to the LF antenna 31, the drive current so that LF antenna 31 transmits the signal. The LF control unit 304a includes a first transmission control unit 341a and a second transmission control unit 342a as functional blocks. The first transmission control unit 341a and the second transmission control unit 342a may be provided by separate control circuits, or may be provided by a single control circuit.

The first transmission control unit 341a controls, in accordance with a request from the microcomputer 350a, the LF antenna 31 to transmit the request signal, the measurement purpose burst signal, and the noise suppression purpose burst signal. The second transmission control unit 342a controls, in accordance with a request from the microcomputer 350a, another LF antenna 31 to transmit the inverted phase burst signal concurrently with the transmission of the noise suppression purpose burst signal controlled by the first transmission control unit 341a. The phase control unit 305 generates the inverted phase burst signal by shifting the phase of the noise suppression purpose burst signal by 180 degrees. A transmission range of another LF antenna 31 that transmits the inverted phase burst signal does not overlap with the transmission range of the LF antenna 31 that transmits the request signal.

For example, in the welcome scene, the first transmission control unit 341a performs a polling of the D seat antenna 31D, the P seat antenna 31P, and the rear bumper antenna 31R to periodically and repeatedly transmit the request signal including the Wakeup ID but not the random number code, the measurement purpose burst signal and the noise suppression purpose burst signal following the request signal. The second transmission control unit 342a controls another LF antenna 31 to transmit the inverted phase burst signal concurrently with the transmission of the noise suppression purpose burst signal which is followed by the transmission of request signal. A transmission range of another LF antenna 31 does not overlap with the transmission range of the LF antenna 31 that transmits the request signal.

In the unlocking scene, the first transmission control unit 341a controls the outside antenna corresponding to the outside SW that is operated to transmit the request signal, which includes the Wakeup ID and the random number code, the measurement purpose burst signal and the noise suppression purpose burst signal following the request signal. The second transmission control unit 342a controls another LF antenna 31 to transmit the inverted phase burst signal concurrently with the transmission of the noise suppression purpose burst signal which is followed by the transmission of request signal. A transmission range of another LF antenna 31 does not overlap with the transmission range of the LF antenna 31 that transmits the request signal.

In the locking scene, the first transmission control unit 341a controls the outside antenna corresponding to the outside SW that is operated to transmit the request signal, which includes the Wakeup ID and the random number code, the measurement purpose burst signal and the noise suppression purpose burst signal following the request signal. After transmitting the request signal, the first transmission control unit 341a shifts a transmission time of the measurement purpose burst signal from the transmission time of request signal, and controls the inside antennas of the vehicle to transmit the measurement purpose burst signal in a predetermined order. The second transmission control unit 342a controls another LF antenna 31 to transmit the inverted phase burst signal concurrently with the transmission of the noise suppression purpose burst signal which is followed by the transmission of request signal. A transmission range of another LF antenna 31 does not overlap with the transmission range of the LF antenna 31 that transmits the request signal.

Figure 9:
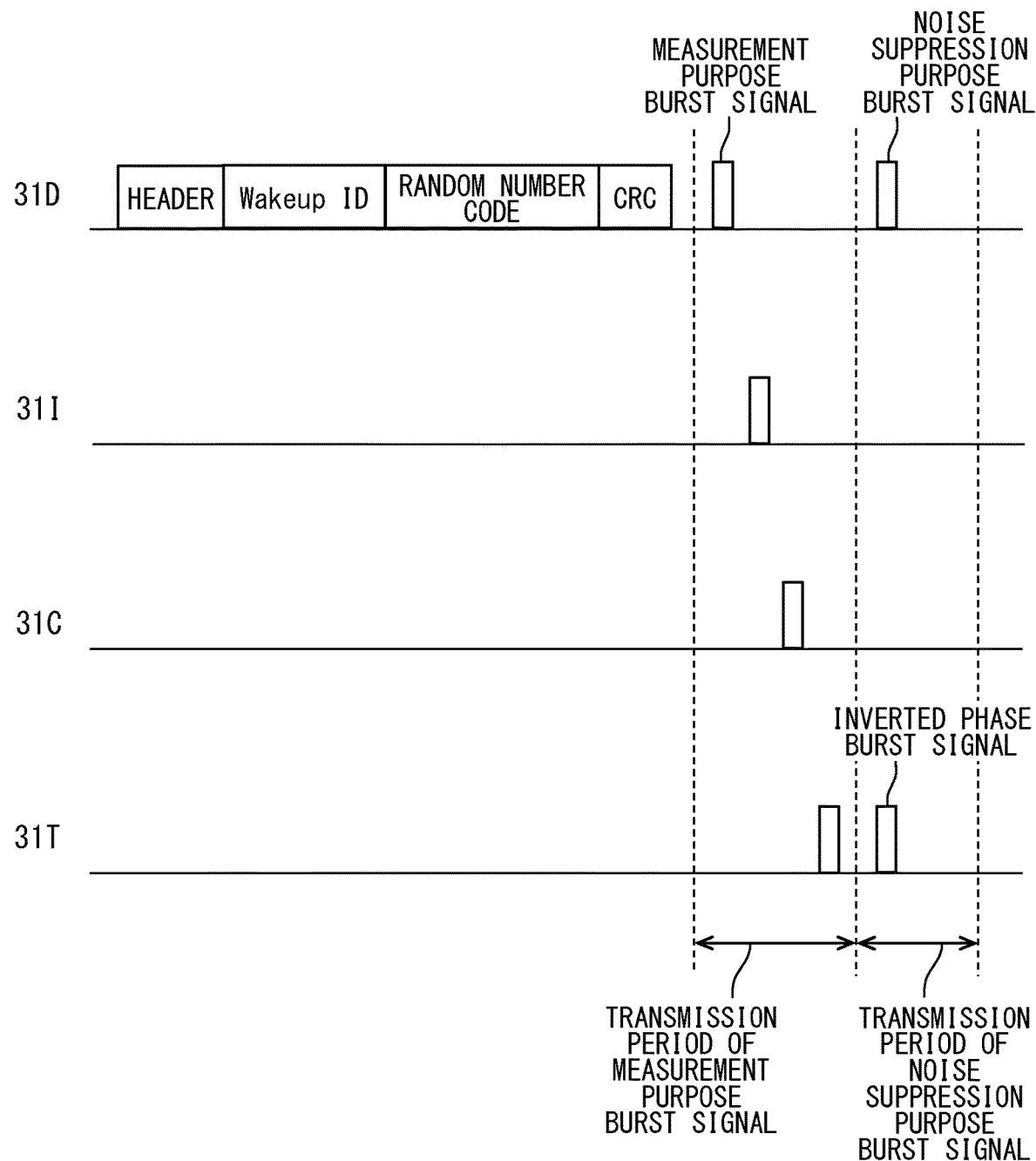
FIG. 9 is a diagram showing an example of signal transmission in a case of vehicle locked situation according to a third embodiment.

The following will describe an example of signal transmission in the locking scene with reference to FIG. 9. In the example shown in FIG. 9, suppose that the D seat door handle SW 33 is operated by the user, and the D seat antenna 31D transmits the request signal. In the example shown in FIG. 9, suppose that the trunk antenna 31T whose transmission range does not overlap with the transmission range of the D seat antenna 31D transmits the inverted phase burst signal.

When the D seat door handle SW 33 is operated, as shown in FIG. 9, the D seat antenna 31D transmits the request signal including the Wakeup ID and the random number code, and then transmits the measurement purpose burst signal and the noise suppression purpose burst signal following the request signal. After transmission of the request signal and the measurement purpose burst signal from the D seat antenna 31D, the measurement purpose burst signal is transmitted from other inside antennas, such as the instrument panel antenna 31I, the center console antenna 31C, and the trunk antenna 31T in a predetermined order by shifting the transmission time of the measurement purpose burst signal from one another. In the example shown in FIG. 9, the measurement purpose burst signal is transmitted in the order of the instrument panel antenna 31I, the center console antenna 31C, and the trunk antenna 31T at different transmission times from one another. The transmission time of the measurement purpose burst signal is shifted among multiple LF antennas 31 in order to distinguish the measurement purpose burst signal is transmitted from which LF antenna 31. After the trunk antenna 31T transmits the measurement purpose burst signal, the trunk antenna 31T transmits the inverted phase burst signal concurrently with the transmission of the noise suppression purpose burst signal from the D seat antenna 31D.

In the departure scene, the first transmission control unit 341a controls the instrument panel antenna 31I corresponding to the push SW 36 that is operated to transmit the request signal, which includes the Wakeup ID and the random number code, the measurement purpose burst signal and the noise suppression purpose burst signal following the request signal. The second transmission control unit 342a controls an outside antenna to transmit the inverted phase burst signal concurrently with the transmission of the noise suppression purpose burst signal which is followed by the transmission of request signal. A transmission range of the outside antenna that transmits the inverted phase burst signal does not overlap with the transmission range of the instrument panel antenna 31I that transmits the request signal.

When the BCM 30a drives the LF antenna 31 to transmit the signals, the signals are transmitted from the LF antenna 31. At the same time, radiation noise of the signals are also transmitted from the wiring and wire harness of the printed circuit of BCM 30a and extends toward the immediate vicinity of the BCM 30a.

The transmission range of the LF antenna 31 that transmits the request signal does not overlap with the LF antenna 31 that transmits the inverted phase burst signal. Thus, when the portable device 2a exists within the transmission range of the LF antenna 31 that transmits the request signal, the portable device 2a receives the request signal and the noise suppression purpose burst signal following the request signal. In a case where the portable device 2a exists in the immediate vicinity of the BCM 30a, the radiation noise of the noise suppression purpose burst signal, which follows the request signal, and the radiation noise of inverted phase burst signal are substantially concurrently received by the portable device 2a. When the portable device 2a receives the radiation noises at substantially the same time, the sine wave of the radio wave carrying the inverted phase burst signal has an inverted wave signal with respect to the sine wave of the radio wave carrying the noise suppression purpose burst signal. Therefore, the noise suppression purpose burst signal is canceled by the inverted phase burst signal. With this configuration, the portable device 2a may receive the radiation noise as the request signal, but the reception of the radiation noise as the noise suppression purpose burst signal can be prevented.

When transmitting the inverted phase burst signal, the second transmission control unit 342a may control transmission of the inverted phase burst signal using radio wave having an equal level of transmission output power to that of the radio wave by which the request signal is transmitted. With this configuration, the radiation noise of the inverted phase burst signal generated in the immediate vicinity of the BCM 30a can be more reliably canceled by the radiation noise of the noise suppression purpose burst signal generated in the immediate vicinity of the BCM 30a. The equal level is not limited to an exactly equal level, but also includes a substantially equal range.

In the present embodiment, the inverted phase burst signal is transmitted from one LF antenna 31. However, the transmission of inverted phase burst signal is not limited to one LF antenna. For example, the inverted phase burst signal may be transmitted from multiple LF antennas 31 whose transmission ranges do not overlap with the LF antenna 31 that transmits the request signal at the same time with the transmission of noise suppression purpose burst signal. When the second transmission control unit 342a controls multiple LF antennas 31 to transmit the inverted phase burst signal, a total transmission output power of the radio waves of the multiple antennas 31 by which the inverted phase burst signal is carried is set to be equal level to the transmission output power of the radio wave by which the request signal is carried.

(Schematic Configuration of Portable Device 2a)

Figure 10:
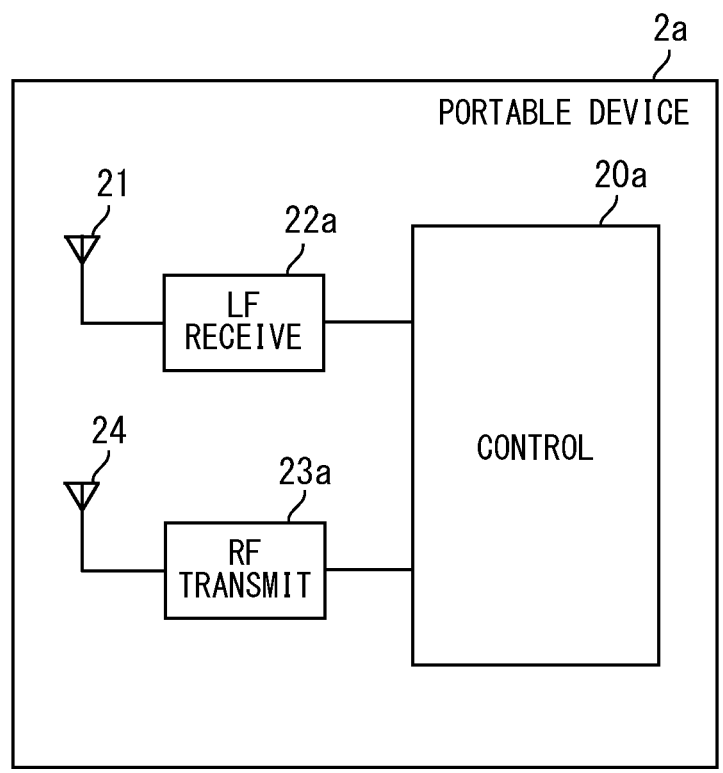
FIG. 10 is a diagram showing an example of a schematic configuration of a portable device.

The following will describe a configuration of the portable device 2a with reference to FIG. 10. As shown in FIG. 10, the portable device 2a includes a control device 20a, a LF reception antenna 21, a LF reception unit 22a, a RF transmission unit 23a, and a RF transmission antenna 24. The portable device 2a is similar to the portable device 2 of the first embodiment except that the portable device 2a includes the control device 20a, the LF reception unit 22a, and the RF transmission unit 23a instead of the control device 20, the LF reception unit 22, and the RF transmission unit 23.

The LF reception unit 22a is similar to the LF reception unit 22 of the first embodiment except that the LF reception unit 22a measures RSSI of the burst signal received by the LF reception antenna 21 followed by the request signal and outputs the measured RSSI to the control device 20a. The LF reception unit 22a measures the RSSI of the burst signal by, for example, an RSSI measuring circuit or the like. The LF reception unit 22a measures the RSSI of the measurement purpose burst signal and also measures the RSSI of noise suppression purpose burst signal.

The control device 20a is similar to the control device 20 of the first embodiment except that the control device 20a executes a process according to the RSSI of the burst signal which is measured by the LF reception unit 22a. The control device 20a determines whether the measured RSSI of the measurement purpose burst signal is within the threshold range which is set for the measurement purpose burst signal in advance. Then, the control device 20a includes the information (hereinafter referred to as threshold determination information) indicating whether the RSSI is within the threshold range in the response signal, and transmits the response signal from the RF transmission unit 23a. The threshold range may be preliminarily set as described above.

The control device 20a determines whether the measured RSSI of the noise suppression purpose burst signal is equal to or higher than a threshold value (hereinafter referred to as noise suppression threshold value) which is set for the noise suppression purpose burst signal in advance. The noise suppression threshold value is set so that that a small level of the noise suppression purpose burst signal remained after the noise suppression burst signal included in the radiation noise is canceled by the inverted phase burst signal included in the radiated noise can be distinguished from the noise suppression purpose burst signal which is not canceled by the inverted phase burst signal. When the measured RSSI of the noise suppression purpose burst signal is equal to or higher than the noise suppression threshold value, the control device 20a determines the reception of the noise suppression purpose burst signal and transmits the response signal from the RF transmission unit 23a. When the measured RSSI of the noise suppression purpose burst signal is lower than the noise suppression threshold value, the control device 20a determines that the noise suppression purpose burst signal is not received and does not transmit the response signal from the RF transmission unit 23a.

Whether the signal received by the LF reception antenna 21 is the measurement purpose burst signal or the noise suppression purpose burst signal may be distinguished by the transmission time of the signal which is preliminarily set with respect to the transmission time of the request signal.

The RF transmission unit 23a is similar to the RF transmission unit 23a except that the RF transmission unit 23a transmits the response signal including the threshold determination information from the RF transmission antenna 24 and the response signal is not transmitted when the noise suppression purpose burst signal is not received after reception of the request signal. The RF transmission unit 23a corresponds to a portable device transmission unit.

(Transmission Control Related Process in BCM 30a)

Figure 11:
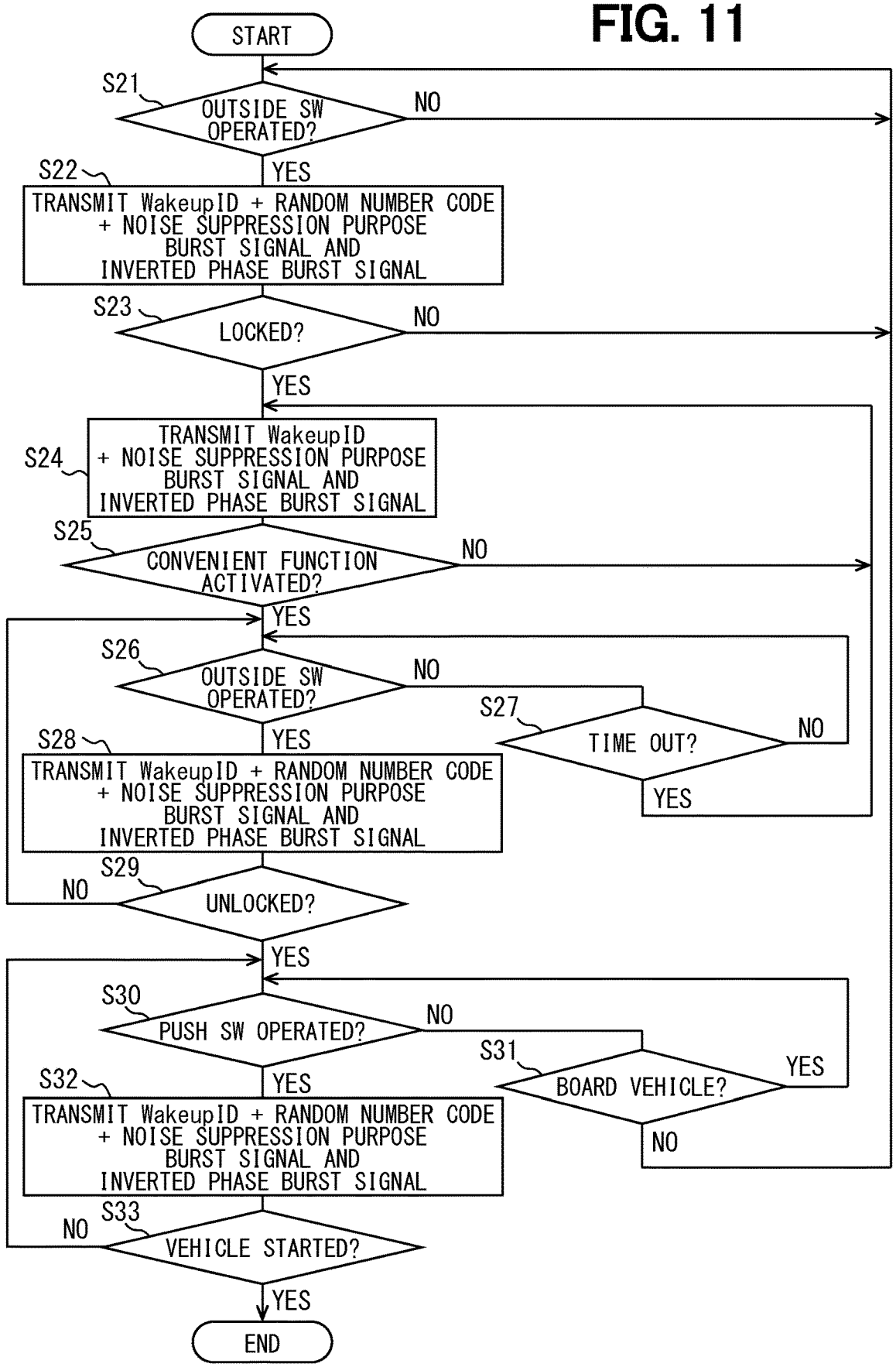
FIG. 11 is a flowchart showing an example of a transmission control process executed by a BCM.

The following will describe an example of the transmission control related process executed by the BCM 30a with reference to FIG. 11. The flowchart of FIG. 11 may be configured to start when the vehicle is parked and then the vehicle door is opened and closed.

The process in S21 is similar to the process in S1. In S21, when the outside SW is operated (S21: YES), the process proceeds to S22. When the outside SW is not operated (S21: NO), the process in S21 is repeated.

In S22, the communication data generation unit 356a generates the request signal data which includes the Wakeup ID and the random number code. The request unit 358a request a transmission of the request signal, which includes the Wakeup ID and the random number code, the measurement purpose burst signal and the noise suppression purpose burst signal following the request signal from the outside antenna which corresponds to the outside SW that is determined to be operated in S21. The request unit 358a requests a transmission of the inverted phase burst signal from another LF antenna 31 concurrently with the transmission of the noise suppression purpose burst signal which is transmitted after the request signal. Another LF antenna 31 is different from the LF antenna 31 that transmits the request signal, and has a transmission range that does not overlap with a transmission range of the LF antenna 31 that transmits the request signal. As a result, the request signal including the Wakeup ID and the random number code, the measurement purpose burst signal, and the noise suppression purpose burst signal are transmitted in order from the outside antenna corresponding to the outside switch that is determined to be operated in S21. At the same transmission time of the noise suppression purpose burst signal, the inverted phase burst signal is transmitted from another LF antenna 31 whose transmission range does not overlap with the transmission range of the outside antenna that transmits the request signal.

When the portable device 2a exists in the immediate vicinity of the BCM 30a and receives the radiation noise from the BCM 30a, as described above, the noise suppression purpose burst signal included in the radiation noise is canceled by the inverted phase burst signal included in the radiation noise. Therefore, the response signal is not transmitted from the portable device 2. When the portable device 2a exists within the transmission range of the outside antenna corresponding to the outside switch determined to be operated in S21, the noise suppression purpose burst signal is not canceled by the inverted phase burst signal and the portable device 2a transmits the response signal in response to the request signal. The verification unit 360a authenticates the encrypted code included in the response signal transmitted from the portable device 2a, and locks the vehicle door in response to the success of the authentication.

In S23, when the verification unit 360a determines that the authentication is succeeded, the vehicle door is locked (S23: YES), and the process proceeds to S24. When the verification unit 360a determines the authentication is failed, the vehicle door is not locked (S23: NO), and the process returns to S21 and the process is repeated.

In S24, the communication data generation unit 356a generates the request signal data which includes the Wakeup ID but not include the random number code. The request unit 358a periodically requests the transmission of request signal, which includes the Wakeup ID, the measurement purpose burst signal and the noise suppression purpose burst signal following the request signal in a predetermined order, such as the D seat antenna 31D, the P seat antenna 31P, and the rear bumper antenna 31R in described order. The request unit 358a requests a transmission of the inverted phase burst signal from another LF antenna 31 concurrently with the transmission of the noise suppression purpose burst signal. Another LF antenna 31 is different from the LF antenna 31 that transmits the request signal, and has a transmission range that does not overlap with a transmission range of the LF antenna 31 that transmits the request signal. With this configuration, polling is performed so that the request signals including the Wakeup ID but not including the random number code is periodically and sequentially transmitted from the D seat antenna 31D, the P seat antenna 31P, and the rear bumper antenna 31R. The inverted phase burst signal is periodically transmitted from another LF antenna 31 concurrently with the transmission of the noise suppression purpose burst signal which is transmitted after the request signal by the outside antenna. Another LF antenna 31 is different from the outside antenna that transmits the request signal, and has a transmission range that does not overlap with a transmission range of the outside antenna that transmits the request signal.

When the portable device 2a exists within the transmission range of the outside antenna, the noise suppression purpose burst signal is not canceled by the inverted phase burst signal and the portable device 2a transmits the response signal in response to the request signal. When the request signal does not include the random number code, the response signal in response to the request signal does not include the encrypted code. In response to the RF receiver 32 receiving the response signal that does not include the encrypted code, the verification unit 360 activates the convenient function such as turning on the welcome light or the like.

In S25, when the verification unit 360a determines activation of the convenient function (S25: YES), the process proceeds to S26. When the verification unit 360a determines non-activation of the convenient function (S25: NO), the process returns to S24. At S24, the periodic transmission of the request signal is repeated.

In S26, when the outside SW of the vehicle is operated (S26: YES), the process proceeds to S28. When the outside SW is not operated (S26: NO), the process proceeds to S27. In S27, when the elapsed time from the activation of the convenient function in S25 exceeds a predetermined duration, that is, time outs (S27: YES), the process returns to S24 and the periodic transmission of the request signal is repeated. When the elapsed time from the activation of the convenience function in S25 does not exceed the predetermined duration, that is, time does not out (S27: NO), the process returns to S26 and repeats S26 and S27. The predetermined duration for determining timeout may be properly set as necessary.

The process in S28 is similar to the process in S22. The request signal including the Wakeup ID and the random number code, the measurement purpose burst signal, and the noise suppression purpose burst signal are transmitted in order from the outside antenna corresponding to the outside switch that is determined to be operated in S26. At the same transmission time of the noise suppression purpose burst signal, the inverted phase burst signal is transmitted from another LF antenna 31 whose transmission range does not overlap with the transmission range of the outside antenna that transmits the request signal.

When the portable device 2a exists within the transmission range of the outside antenna, the noise suppression purpose burst signal is not canceled by the inverted phase burst signal and the portable device 2a transmits the response signal in response to the request signal. The verification unit 360a authenticates the encrypted code included in the response signal transmitted from the portable device 2a, and unlocks the vehicle door in response to the success of the authentication.

In S29, when the verification unit 360a determines that the authentication is succeeded, the vehicle door is unlocked (S29: YES), and the process proceeds to S30. When the verification unit 360a determines the authentication is failed, the vehicle door is not unlocked (S29: NO), and the process returns to S26 and the process is repeated.

In S30, when the push SW 36 is operated (S30: YES), the process proceeds to S32. When the push SW 36 is not operated (S30: NO), the process proceeds to S31. In S31, when the user is in the vehicle compartment (S31: YES), the process returns to S30 and repeats S30 and S31. When the user is not in the vehicle compartment (S31: NO), the process returns to S21 and the process is repeated.

In S32, the communication data generation unit 356a generates the request signal data which includes the Wakeup ID and the random number code. The request unit 358a request a transmission of the request signal, which includes the Wakeup ID and the random number code, the measurement purpose burst signal and the noise suppression purpose burst signal following the request signal from the instrument panel antenna 311. The request unit 358a requests a transmission of the inverted phase burst signal from outside antenna concurrently with the transmission of the noise suppression purpose burst signal. The outside antenna is different from the instrument panel antenna 311 that transmits the request signal, and has a transmission range that does not overlap with a transmission range of the instrument panel antenna 311 that transmits the request signal. As a result, the request signal including the Wakeup ID and the random number code, the measurement purpose burst signal, and the noise suppression purpose burst signal are transmitted in order from the instrument panel antenna 311. At the same transmission time of the noise suppression purpose burst signal, the inverted phase burst signal is transmitted from the outside antenna whose transmission range does not overlap with the transmission range of the instrument panel antenna 311.

When the portable device 2a exists within the transmission range of the instrument panel antenna 311, the noise suppression purpose burst signal is not canceled by the inverted phase burst signal and the portable device 2a transmits the response signal in response to the request signal. The verification unit 360a authenticates the encrypted code included in the response signal transmitted from the portable device 2a, and permits a start of driving source of the vehicle door in response to the success of the authentication.

In S33, when the verification unit 360a succeeds in the authentication and the driving source of the vehicle is started (S33: YES), the transmission control related process is ended. When the verification unit 360a fails in the authentication and the driving source of the vehicle is not started (S33: NO), the process returns to S30 and the process is repeated.

(Response Transmission Related Process in Portable Device 2a)

Figure 12:
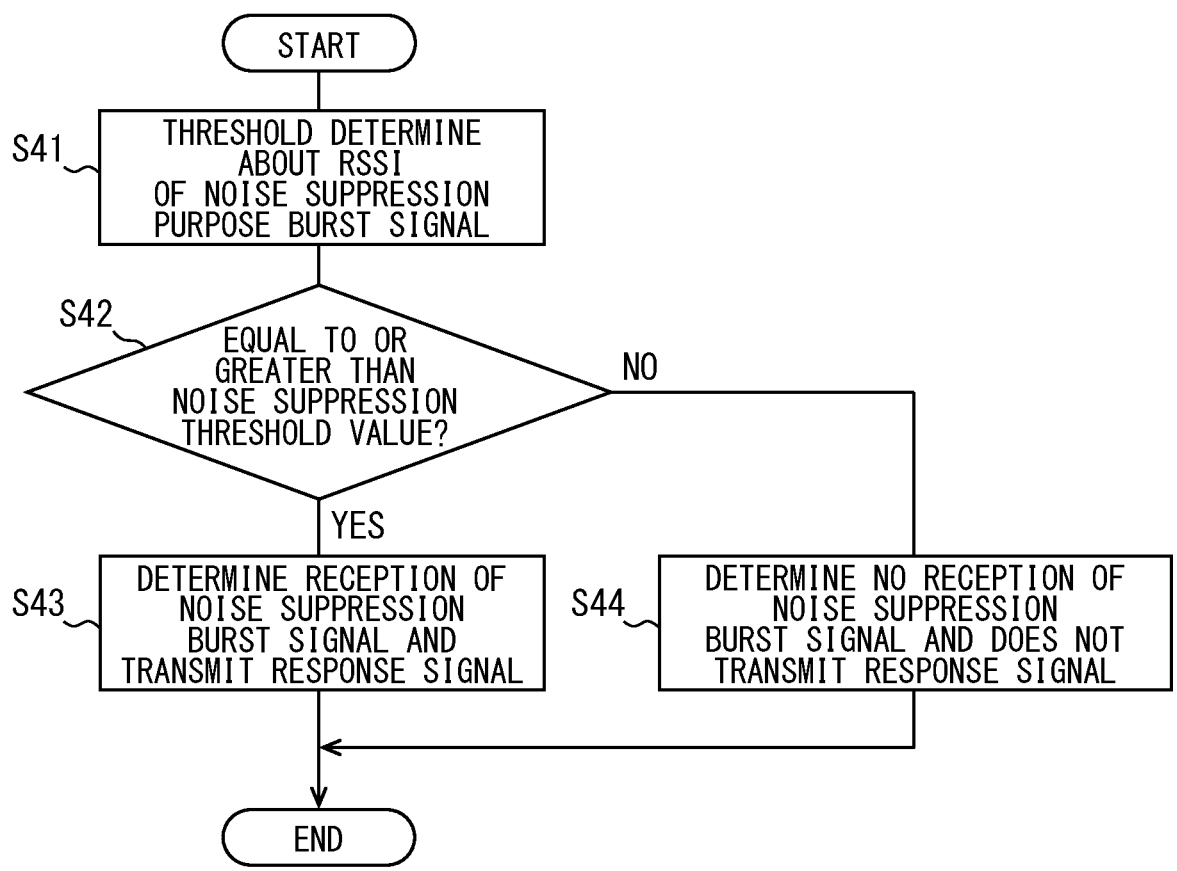
FIG. 12 is a flowchart showing an example of response transmission process executed by a portable device.

The following will describe an example of a process (hereinafter referred to as response transmission related process) related to a transmission of the response signal by the portable device 2a with reference to the flowchart shown in FIG. 12. The flowchart of FIG. 12 may be configured to start when the portable device 2a shifts to the wakeup state in response to receiving the Wakeup ID included in the request signal by the LF reception antenna 21.

In S41, the control device 20a determines whether the measured RSSI of the noise suppression purpose burst signal is equal to or higher than the noise suppression threshold value. In S41, in response to the measured RSSI being equal to or higher than the noise suppression threshold value (S42: YES), the process proceeds to S43. In S41, in response to the measured RSSI being lower than the noise suppression threshold value (S42: YES), the process proceeds to S44.

In S43, the control device 20a determines the reception of the noise suppression purpose burst signal, and then the control device 20a transmits the response signal from the RF transmission unit 23a. Then, the response transmission related processing is ended. When the request signal received by the LF reception antenna 21 includes the random number code, the response signal includes the encrypted code obtained by encrypting the received random number code. The response signal also includes the above-described threshold determination information. In S44, the control device 20a determines that the noise suppression purpose burst signal is not received, and then the control device 20a does not transmit the response signal from the RF transmission unit 23a. Then, the response transmission related processing is ended.

According to the configuration of the third embodiment, the transmission of the inverted phase burst signal whose phase is shifted by 180 degrees from the noise suppression purpose burst signal is executed concurrently with the transmission of the noise suppression purpose burst signal which is transmitted after the request signal including the wakeup ID. The LF antenna 31 that transmits the inverted phase burst signal has the transmission range which does not overlap with the transmission range of the LF antenna 31 that transmits the noise suppression purpose burst signal. Therefore, even when the radiation noise of these signals is radiated in the immediate vicinity of the BCM 30a, the noise suppression purpose burst signal included in the radiation noise is canceled by the inverted phase burst signal included in the radiation noise. Therefore, although the radiation noise of the request signal which includes the Wakeup ID may be received as the request signal including the Wakeup ID, the reception of the radiation noise of the noise suppression purpose burst signal as the noise suppression purpose burst signal itself can be prevented.

The transmission range of the LF antenna 31 that transmits the request signal and the noise suppression purpose burst signal following the request signal is set to not overlap with the transmission range of the LF antenna 31 that transmits the inverted phase burst signal. Thus, within the transmission range of the LF antenna 31 that transmits the request signal, the noise suppression purpose burst signal which follows the request signal is prevented from being canceled by the inverted phase burst signal.

When the portable device 2a receives the noise suppression burst signal following the request signal including the Wakeup ID, the portable device 2a transmits the response signal. When the portable device 2a fails to receive the noise suppression purpose burst signal after the reception of request signal including the Wakeup ID, the portable device 2a does not transmit the response signal. Therefore, the portable device 2a is able to transmit the response signal in response to the request signal transmitted within the transmission range of the LF antenna 31. However, the portable device 2a does not transmit the response signal in response to the radiation noise of the request signal within the transmission range of the LF antenna 31 that transmits the request signal. Therefore, it is possible to suppress erroneous detection such that the BCM 30a detects that the portable device 2a exists outside the vehicle compartment even though the portable device 2a actually exists in the vehicle compartment.

Fourth Embodiment

In the third embodiment, the BCM 30a transmits the measurement purpose burst signal following the request signal. The BCM 30 in the first embodiment may also transmit the measurement purpose burst signal following the request signal. In this case, the portable device 2 of the first embodiment may be configured to measure the RSSI of the measurement purpose burst signal, and includes the threshold determination information in the response signal when transmitting the response signal. The BCM 30 in the first embodiment may be configured to use the threshold determination information as a success condition of the authentication similar to the third embodiment.

Fifth Embodiment

In the third embodiment, the BCM 30a transmits the measurement purpose burst signal after the transmission of request signal. The present disclosure is not necessarily limited to this configuration. For example, the BCM 30a may be configured to transmit the request signal but not to transmit the measurement purpose burst purpose signal following the request signal.

Sixth Embodiment

In the foregoing embodiments, the request signal including the random number code is transmitted in response to the operation of the outside SW of the vehicle as a trigger during the parked and locked state of the vehicle. The present disclosure is not necessarily limited to this configuration. For example, when the vehicle is in parked and locked state, the request signal including the random number code may also be periodically transmitted before the operation of the outdoor SW.

Seventh Embodiment

In the above embodiment, the request signal is also periodically transmitted before the operation of the outside SW of the vehicle when the vehicle is in parked and locked state. The present disclosure is not necessarily limited to this configuration. For example, when the vehicle is in parked and locked state, the request signal may be configured not be transmitted until the outdoor SW is operated.

Eighth Embodiment

In the foregoing embodiments, the vehicle unit 3 and 3a includes, as the LF antennas 31, the D seat antenna 31D, the P seat antenna 31P, the rear bumper antenna 31R, the instrument panel antenna 311, the center console antenna 31C, and the trunk antenna 31T. However, the present disclosure is not limited to this configuration. Under a condition that two or more LF antennas 31 are disposed so that transmission ranges do not overlap with one another, the arrangement of the antennas and the number of antennas may be different from the above-described configuration.

Note that the present disclosure is not limited to the embodiments described above and can variously be modified within the scope of the disclosure. An embodiment obtained by appropriately combining the technical means disclosed in the different embodiments is also included in the technical scope of the present disclosure. The control device, control unit and the control method described in the present disclosure may be implemented by a special purpose computer which includes a processor programmed to execute one or more functions executed by computer programs. Alternatively, the control device and the control method described in the present disclosure may be implemented by a special purpose hardware logic circuit. Alternatively, the control device and the control method described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium as a program product.

It is noted that a flowchart or the process of the flowchart in the present disclosure includes multiple steps (also referred to as sections), each of which is represented, for example, as S1. Further, each step can be divided into several sub-steps while several steps can be combined into a single step.

While various embodiments, configurations, and aspects of the transmission control device vehicle system, transmission control method, and the control program product according to the present disclosure have been exemplified, the embodiments, configurations, and aspects of the present disclosure are not limited to those described above. For example, embodiments, configurations, and examples obtained from an appropriate combination of technical elements disclosed in different embodiments, configurations, and examples are also included within the scope of the embodiments, configurations, and examples of the present disclosure.

What is claimed is:

1. A transmission control device mounted on a vehicle and driving a plurality of antennas to detect a position of a portable device relative to the vehicle using a wireless communication between the portable device and the plurality of antennas, the plurality of antennas being arranged at respective positions of the vehicle and having different transmission ranges from one another, and the portable device being carried by a user, the transmission control device comprising:

a processor and memory configured to:

control a genuine transmission antenna to transmit, with use of a carrier wave, a genuine code that activates the portable device, and the genuine transmission antenna being one of the plurality of antennas; and control an inversion transmission antenna to transmit, with use of a carrier wave, an inversion code including at least partial inverted genuine code concurrently with a transmission of the genuine code from the genuine transmission antenna, and the inversion transmission antenna being one of the plurality of antennas and having a transmission range that does not overlap with a transmission range of the genuine transmission antenna.

2. The transmission control device according to claim 1, wherein the processor controls the genuine transmission antenna to periodically transmit the genuine code during a parking state of the vehicle, and while the processor controls the genuine transmission antenna to periodically transmit the genuine code during the parking state of the vehicle, the processor controls the inversion transmission antenna to transmit the inversion code which is obtained by inverting partial bits of the genuine code.

3. The transmission control device according to claim 2, wherein the processor controls the genuine transmission antenna to transmit the genuine code in response to an operation made by the user to a switch of the vehicle for boarding the vehicle, the processor controls the genuine transmission antenna to periodically transmit the genuine code during the parking state of the vehicle, when the processor controls the genuine transmission antenna to transmit the genuine code in response to the operation made by the user to the switch of the vehicle, the processor controls the inversion transmission antenna to transmit the inversion code which is obtained by inverting entire bits of the genuine code, and while the processor controls the genuine transmission antenna to periodically transmit the genuine code during the parking state of the vehicle, the processor controls the inversion transmission antenna to transmit the inversion code which is obtained by inverting partial bits of the genuine code.

4. The transmission control device according to claim 1, wherein the processor controls the genuine transmission antenna to periodically transmit the genuine code during a parking state of the vehicle, while the processor controls the genuine transmission antenna to periodically transmit the genuine code during the parking state of the vehicle, the processor switches the genuine transmission antenna that transmits the genuine code among the plurality of antennas in a predetermined order, and while the processor controls the genuine transmission antenna to periodically transmit the genuine code during the parking state of the vehicle, the processor switches, corresponding to a switch of the genuine transmission antenna, the inversion transmission antenna that transmits the inversion code among the plurality of antennas in a predetermined order under a condition that the transmission range of the inversion transmission antenna after switch does not overlap with the transmission range of the genuine transmission antenna after switch.

5. The transmission control device according to claim 1, wherein the processor controls the genuine transmission antenna to transmit the genuine code in response to an operation made by the user to a switch of the vehicle for using the vehicle, and when the processor controls the genuine transmission antenna to transmit the genuine code in response to the operation made by the user to the switch of the vehicle, the processor controls the inversion transmission antenna to transmit the inversion code which is obtained by inverting entire bits of the genuine code.

6. The transmission control device according to claim 5, wherein the processor controls the genuine transmission antenna to transmit the genuine code in response to an operation made by the user to one of switches arranged at respective positions of the vehicle for using the vehicle, when transmitting the genuine code in response to the operation of the one of switches, the processor switches the genuine transmission antenna corresponding to the one of switches operated by the user and controls the genuine transmission antenna after switch to transmit the genuine code, and when transmitting the genuine code in response to the operation of the one of switches, the processor switches, corresponding to a switch of the genuine transmission antenna, the inversion transmission antenna that transmits the inversion code among the plurality of antennas under a condition that the transmission range of the inversion transmission antenna after switch does not overlap with the transmission range of the genuine transmission antenna after switch.

7. A transmission control device mounted on a vehicle and driving a plurality of antennas to detect a position of a portable device relative to the vehicle using a wireless communication between the portable device and the plurality of antennas, the plurality of antennas being arranged at respective positions of the vehicle and having different transmission ranges from one another, and the portable device being carried by a user, the transmission control device comprising:

a processor and memory configured to:

control a first transmission antenna to transmit, with use of a carrier wave, a genuine code that activates the portable device and a first burst signal following the genuine code, and the first transmission antenna being one of the plurality of antennas; and control a second transmission antenna to transmit, with use of a carrier wave, a second burst signal having a 180 degrees shifted phase from the first burst signal concurrently with a transmission of the first burst signal from the first transmission antenna, and the second transmission antenna being one of the plurality of antennas and having a transmission range that does not overlap with a transmission range of the first transmission antenna.

8. The transmission control device according to claim 7, wherein, after a transmission of the genuine code, the processor controls the first transmission antenna to transmit a measurement purpose burst signal which is used for measuring a received signal strength in the portable device, and then the processor controls the first transmission antenna to transmit the first burst signal, the processor controls the second transmission antenna to transmit the second burst signal concurrently with the transmission of the first burst signal from the first transmission antenna, and a transmission time of the first burst signal from the first transmission antenna is shifted from a transmission time of the measurement purpose burst signal from the first transmission antenna.

9. A vehicle system comprising:

a portable device carried by a user; and a transmission control device mounted on a vehicle and driving a plurality of antennas to detect a position of the portable device relative to the vehicle using a wireless communication between the portable device and the plurality of antennas, the plurality of antennas being arranged at respective positions of the vehicle and having different transmission ranges from one another, wherein the transmission control device includes a processor and memory configured to:

control a first transmission antenna to transmit, with use of a carrier wave, a genuine code that activates the portable device and a first burst signal following the genuine code, the first transmission antenna being one of the plurality of antennas; and control a second transmission antenna to transmit, with use of a carrier wave, a second burst signal having a 180 degrees shifted phase from the first burst signal concurrently with a transmission of the first burst signal from the first transmission antenna, and the second transmission antenna being one of the plurality of antennas and having a transmission range that does not overlap with a transmission range of the first transmission antenna, the portable device includes a transmission unit, the transmission unit is configured to transmit information which enables a detection of the position of the portable device relative to the vehicle in response to a reception of the first burst signal followed by the genuine code, and the transmission unit is configured to not transmit the information which enables the detection of the position of the portable device relative to the vehicle when the first burst signal is not received after a reception of the genuine code.

10. A transmission control method executed by a transmission control device, which is mounted on a vehicle and drives a plurality of antennas to detect a position of a portable device relative to the vehicle using a wireless communication between the portable device and the plurality of antennas, the plurality of antennas being arranged at respective positions of the vehicle and having different transmission ranges from one another, and the portable device being carried by a user, the transmission control method comprising:

transmitting, with use of a carrier wave from a genuine transmission antenna, a genuine code that activates the portable device, and the genuine transmission antenna being one of the plurality of antennas; and transmitting, with use of a carrier wave from an inversion transmission antenna, an inversion code including at least partial inverted genuine code concurrently with a transmission of the genuine code from the genuine transmission antenna, and the inversion transmission antenna being one of the plurality of antennas and having a transmission range that does not overlap with a transmission range of the genuine transmission antenna.

11. A transmission control method executed by a transmission control device, which is mounted on a vehicle and drives a plurality of antennas to detect a position of a portable device relative to the vehicle using a wireless communication between the portable device and the plurality of antennas, the plurality of antennas being arranged at respective positions of the vehicle and having different transmission ranges from one another, and the portable device being carried by a user, the transmission control method comprising:

transmitting, with use of a carrier wave from a first transmission antenna, a genuine code that activates the portable device and a first burst signal following the genuine code, and the first transmission antenna being one of the plurality of antennas; and transmitting, with use of a carrier wave from a second transmission antenna, a second burst signal having a 180 degrees shifted phase from the first burst signal concurrently with a transmission of the first burst signal from the first transmission antenna, and the second transmission antenna being one of the plurality of antennas and having a transmission range that does not overlap with a transmission range of the first transmission antenna.

12. A computer readable non-transitory tangible medium storing a control program product, the control program product comprising instructions for controlling a computer to be implemented as a transmission control device, wherein the transmission control device is mounted on a vehicle and drives a plurality of antennas to detect a position of the portable device relative to the vehicle using a wireless communication between the portable device and the plurality of antennas, the plurality of antennas are arranged at respective positions of the vehicle and have different transmission ranges from one another, and the portable device is carried by a user, and the control program product further comprises instructions that control the transmission control device to function as a processor and memory configured to:

control a genuine transmission antenna to transmit, with use of a carrier wave, a genuine code that activates the portable device, and the genuine transmission antenna being one of the plurality of antennas; and control an inversion transmission antenna to transmit, with use of a carrier wave, an inversion code including at least partial inverted genuine code concurrently with a transmission of the genuine code from the genuine transmission antenna, and the inversion transmission antenna being one of the plurality of antennas and having a transmission range that does not overlap with a transmission range of the genuine transmission antenna.

13. A computer readable non-transitory tangible medium storing a control program product, the control program product comprising instructions for controlling a computer to be implemented as a transmission control device, wherein the transmission control device is mounted on a vehicle and drives a plurality of antennas to detect a position of the portable device relative to the vehicle using a wireless communication between the portable device and the plurality of antennas, the plurality of antennas are arranged at respective positions of the vehicle and have different transmission ranges from one another, and the portable device is carried by a user, and the control program further comprises instructions that control the transmission control device to function as a processor and memory configured to:

control a first transmission antenna to transmit, with use of a carrier wave, a genuine code that activates the portable device and a first burst signal following the genuine code, and the first transmission antenna being one of the plurality of antennas; and control a second transmission antenna to transmit, with use of a carrier wave, a second burst signal having a 180 degrees shifted phase from the first burst signal concurrently with a transmission of the first burst signal from the first transmission antenna, and the second transmission antenna being one of the plurality of antennas and having a transmission range that does not overlap with a transmission range of the first transmission antenna.

* * * * *